US007249100B2

(12) United States Patent
Murto et al.

(10) Patent No.: US 7,249,100 B2
(45) Date of Patent: Jul. 24, 2007

(54) SERVICE DISCOVERY ACCESS TO USER LOCATION

(75) Inventors: Juhani Murto, Helsinki (FI); Mikko Olkkonen, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 871 days.

(21) Appl. No.: 09/854,627

(22) Filed: May 15, 2001

(65) Prior Publication Data

US 2004/0213409 A1 Oct. 28, 2004

(51) Int. Cl.
*H04L 9/00* (2006.01)
(52) U.S. Cl. ........................................ 705/50
(58) Field of Classification Search .................. 705/78, 705/50, 14, 18, 64, 67; 707/10, 3, 1, 7; 709/201, 709/217, 245, 244, 207, 219; 380/258; 726/1, 726/3; 455/414.2, 414.3
See application file for complete search history.

(56) References Cited

U.S. PATENT DOCUMENTS

| 5,555,446 | A |   | 9/1996  | Jasinski ................. 455/54.2 |
|-----------|---|---|---------|----------------------------------|
| 5,579,535 | A | * | 11/1996 | Orlen et al. .............. 455/421 |
| 5,758,332 | A |   | 5/1998  | Hirotani ..................... 707/1 |
| 5,912,878 | A | * | 6/1999  | Park et al. ................. 370/229 |
| 6,014,090 | A | * | 1/2000  | Rosen et al. .............. 340/905 |
| 6,061,570 | A |   | 5/2000  | Janow ...................... 455/458 |
| 6,073,075 | A |   | 6/2000  | Kondou et al. ........... 701/203 |
| 6,088,730 | A |   | 7/2000  | Kato et al. ................ 709/227 |
| 6,097,313 | A | * | 8/2000  | Takahashi et al. ........ 340/905 |
| 6,115,611 | A |   | 9/2000  | Kimoto et al. ............ 455/456 |

(Continued)

FOREIGN PATENT DOCUMENTS

EP 0 865 188 A2 9/1998

(Continued)

OTHER PUBLICATIONS

UDDI Technical White paper, Sep. 6th, 2000, UDDI.org, Edition 1.*

(Continued)

*Primary Examiner*—Kambiz Zand
*Assistant Examiner*—Thomas Ho
(74) *Attorney, Agent, or Firm*—Morgan & Finnegan LLP

(57) ABSTRACT

A system and method is disclosed to enable a mobile phone or wireless PDA to discover Internet businesses and services by accessing the Universal Description, Discovery and Integration (UDDI) registry using a user's location or coordinates. The method facilitates the formation of a query to the UDDI registry for the wireless device user. The method obtains a location for the user. The method constructs a personal user profile of the user's UDDI searching strategies, locations and Internet accessing preferences. The user profile can be used as a shortcut for online or offline queries to the UDDI registry or for accessing pages from web sites, or updating location information in response to the user's entry of abbreviated inputs to the wireless device. The method is embodied as programmed instructions which may be executed within the user's wireless device to query the UDDI registry. Alternately, method is embodied as programmed instructions which may be executed within a separate knowledge engine server to query the UDDI registry in response to commands (from the user's wireless device. The server can be used to cache files accessed from web sites, for selective forwarding to the user's wireless device.

28 Claims, 17 Drawing Sheets

U.S. PATENT DOCUMENTS

| | | | |
|---|---|---|---|
| 6,167,441 A | 12/2000 | Himmel | 709/217 |
| 6,173,316 B1 | 1/2001 | De Boor et al. | 709/218 |
| 6,195,692 B1 | 2/2001 | Hsu | 709/219 |
| 6,243,596 B1 * | 6/2001 | Kikinis | 455/572 |
| 6,317,594 B1 | 11/2001 | Gossman et al. | |
| 6,317,781 B1 | 11/2001 | De Boor et al. | 709/217 |
| 6,414,955 B1 | 7/2002 | Clare et al. | 370/390 |
| 6,415,291 B2 * | 7/2002 | Bouve et al. | 707/10 |
| 6,421,707 B1 | 7/2002 | Miller et al. | 709/206 |
| 6,430,276 B1 | 8/2002 | Bouvier et al. | 379/121.01 |
| 6,430,624 B1 | 8/2002 | Jamtgaard et al. | |
| 6,434,381 B1 | 8/2002 | Moore et al. | |
| 6,625,456 B1 * | 9/2003 | Busso et al. | 455/456.2 |
| 6,647,257 B2 * | 11/2003 | Owensby | 455/414.1 |
| 6,968,334 B2 | 11/2005 | Salmenkaita et al. | |
| 7,072,886 B2 | 7/2006 | Salmenkaita et al. | |
| 2002/0004746 A1 | 1/2002 | Ferber et al. | |
| 2002/0091754 A1 | 7/2002 | Jang et al. | |
| 2002/0107904 A1 | 8/2002 | Talluri et al. | |
| 2002/0107985 A1 | 8/2002 | Hwang et al. | |
| 2002/0133545 A1 | 9/2002 | Fano et al. | |
| 2002/0174117 A1 | 11/2002 | Nykänen | |
| 2003/0004746 A1 | 1/2003 | Kheirolomoom et al. | |
| 2003/0040324 A1 | 2/2003 | Eldering et al. | |
| 2003/0061211 A1 | 3/2003 | Shultz et al. | |
| 2004/0110497 A1 | 6/2004 | Little | |
| 2004/0139049 A1 | 7/2004 | Hancock et al. | |

FOREIGN PATENT DOCUMENTS

| | | |
|---|---|---|
| GB | 2 349 551 A | 11/2000 |
| WO | WO 99/33293 | 7/1999 |
| WO | WO 99/56326 | 11/1999 |

OTHER PUBLICATIONS

UDDI: an XML Web Service, Dec. 18th, 2000, Chris Lovett, Microsoft corporation, pp. 1-3.*

"Universal Description, Discovery and Integration", Dec. 2000, Matthew J. Dovey, Oxford University.*

"LCS Stage 2 based on E-OTD", May 5,6th, 1999, Sophia-Antipolis.*

Tauber et al., "Surfing the Internet with Netscape Communicator 4", 1997, SybexIinc., Introduction, pp. 78-81, 106-107.*

Hoffman, "Netscape and the World Wide Web for Dummies", 1996, IDG Books Worldwide Inc, p. 112.*

*UDDI Technical White Paper*, Sep. 6, 2000, http://www.uddi.org/pubs/Iru_UDDI_Technical_White_Paper.pdf.

*UDDI Programmer's API 1.0, UDDI Open Draft Specification Sep. 30, 2000*, by Toufic Boubez, et al., http://www.uddi.org/pubs/ProgrammersAPI-VI-1.pdf.

*UDDI Data Structure Reference, UDDI Open Draft Specification Sep. 30, 2000*, by Toufic Boubez, et al., http://www.uddi.org/pubs/DataStructure-V1.pdf.

*Nokia WAP Client Version 2.0, Product Overview*, Nokia Internet Communications, 2000, www.nokia.com/corporate/wap.

*UDDI Executive White Paper*, Sep. 6, 2000, http://www.uddi.org/pubs/UDDI_Executive_White_Paper.pdf.

U.S. Appl. No. 10/078,353, filed Feb. 21, 2002, Petri Nykänen.

Supplementary European Search Report dated Aug. 2, 2006.

Lankhorst et al., "Enabling Technology for Personalizing Mobile Services", System Sciences, Proceedings of the 35th Annual Hawaii International Conference on System Sciences, 2002.

* cited by examiner

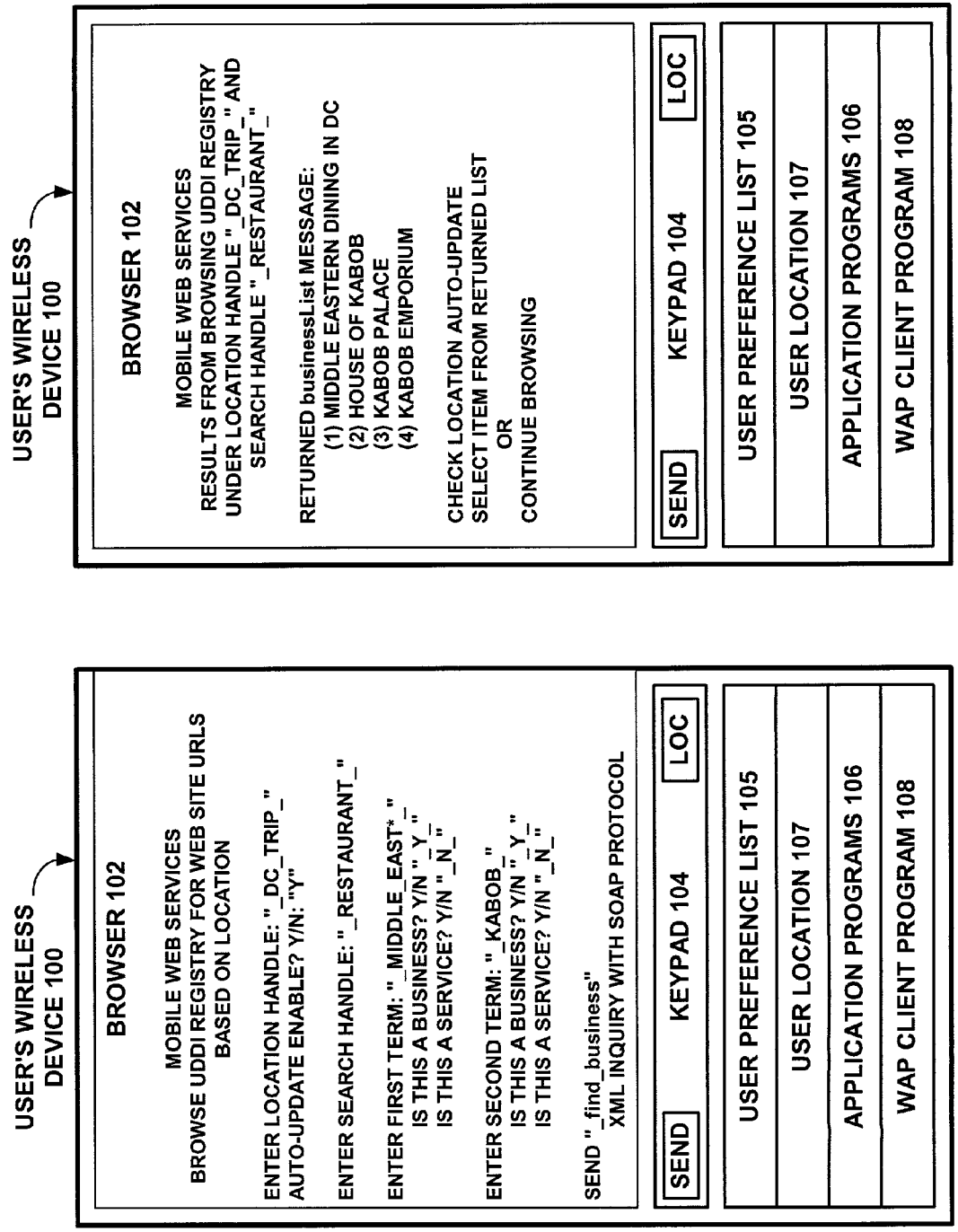

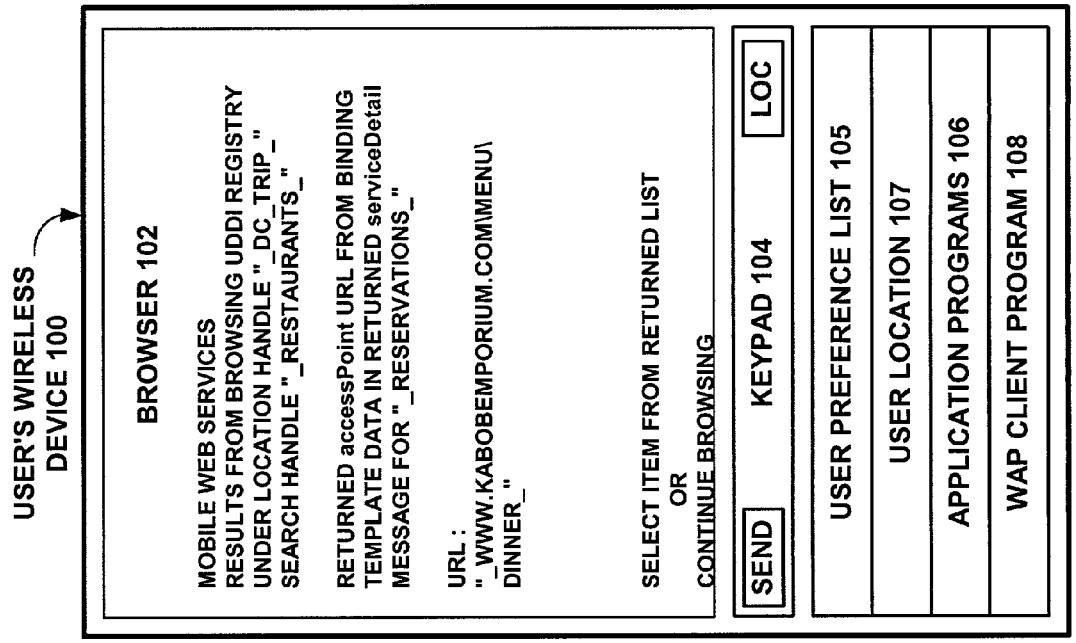
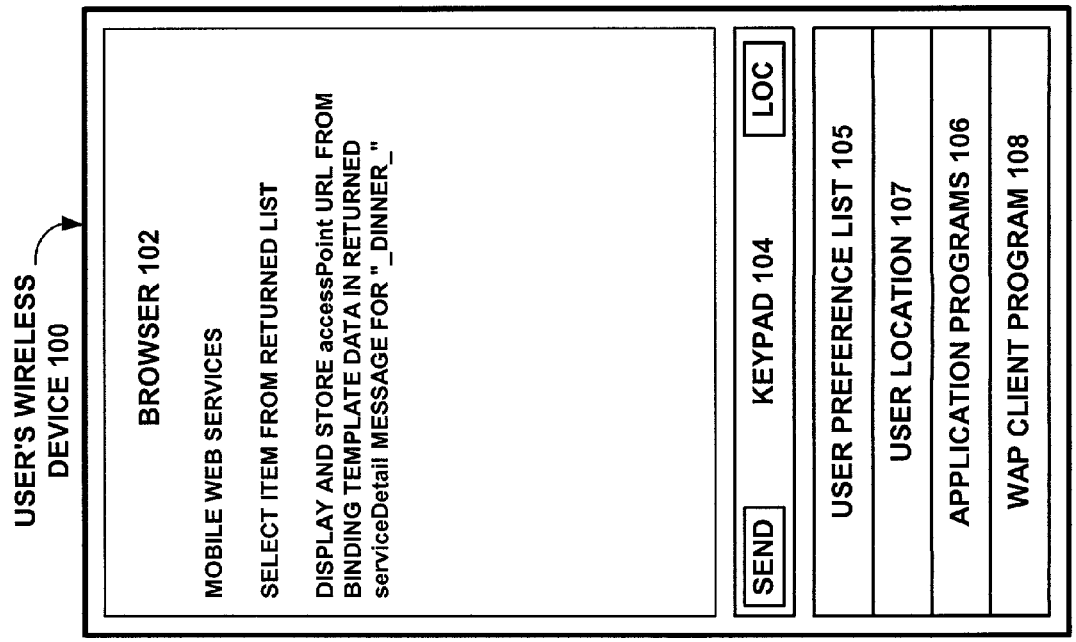
FIG. 1J
FIG. 1I

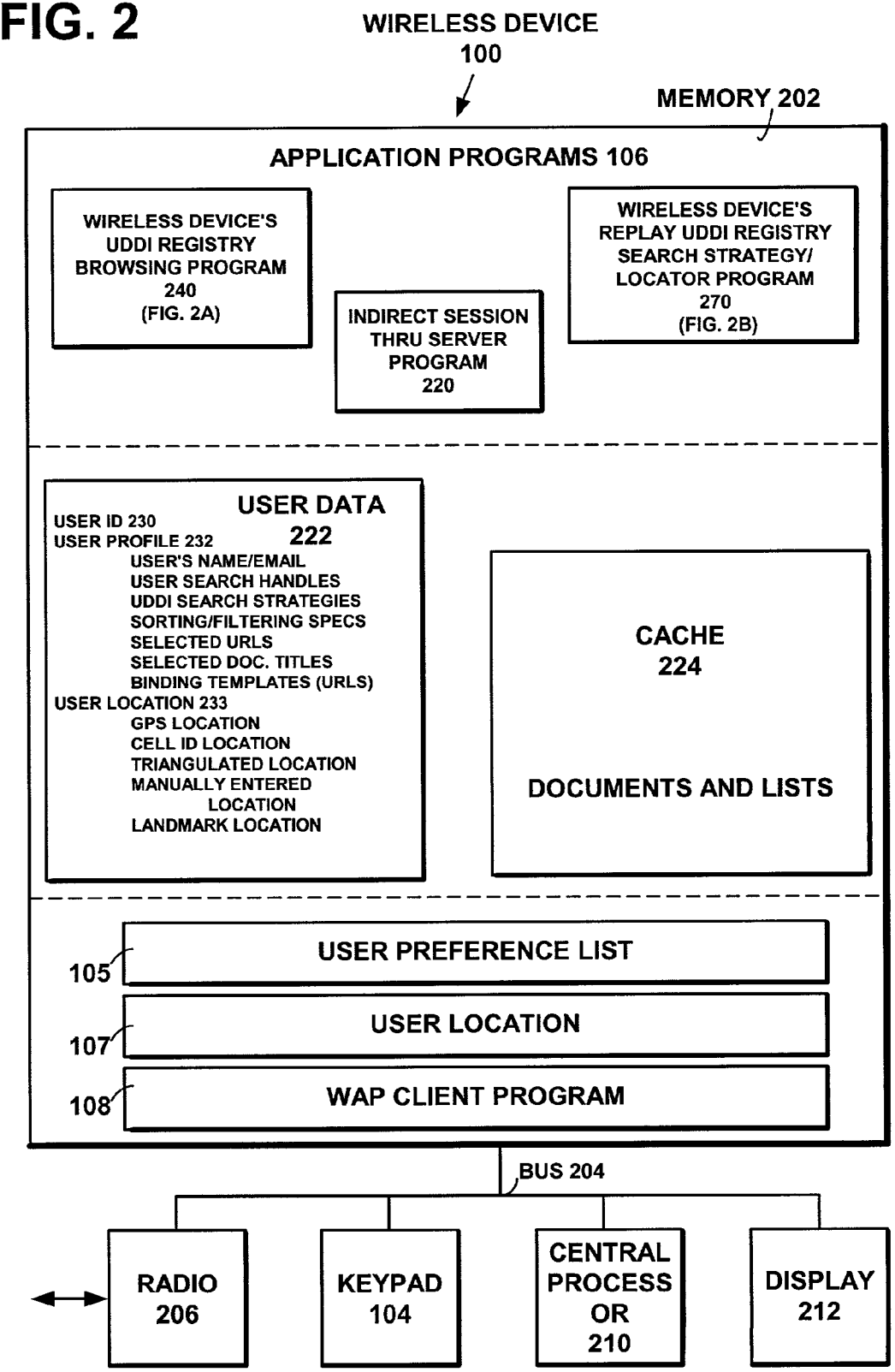

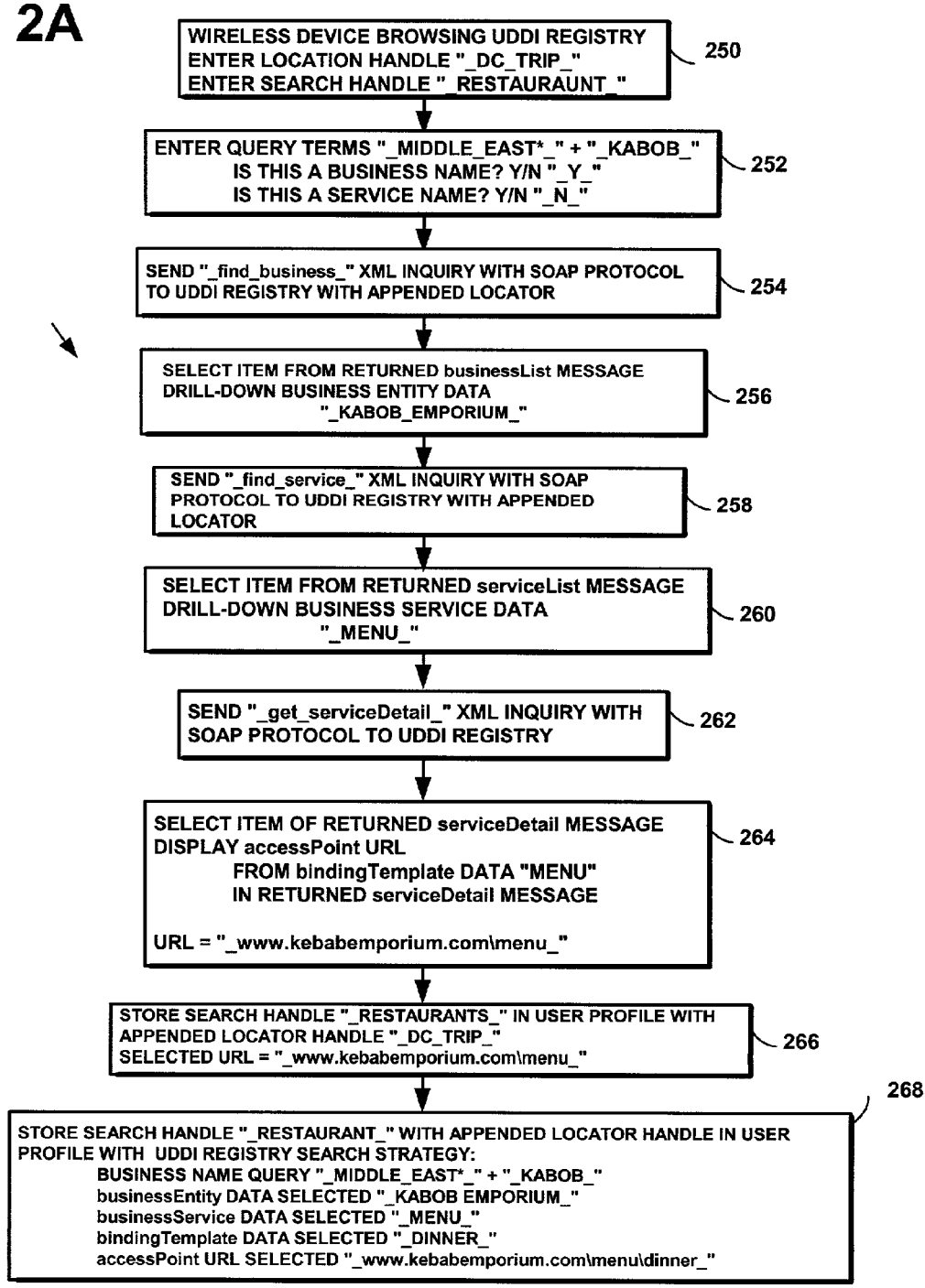

SERVICE DISCOVERY ACCESS TO USER LOCATION

BACKGROUND OF THE INVENTION

1. Field of the Invention

The invention disclosed broadly relates to methods for providing Internet services and more particularly relates to improvements in mobile device accessing of Internet services while the services are linked to a user location.

2. Background Art

Universal Description, Discovery and Integration (UDDI) is a defacto standard for an Internet-based registry. The UDDI registry enables users to discover services and businesses on the Internet. The UDDI standard takes advantage of WorldWide Web Consortium (W3C) standards and Internet Engineering Task Force (IETF) standards such as Extensible Markup Language (XML), Hypertext Transfer Protocol (HTTP), Domain Name System (DNS) protocol, and Simple Object Access Protocol (SOAP) messaging protocol. The UDDI registry enables users to quickly, easily and dynamically find businesses and services on the Internet. The UDDI registry enables businesses to reach their customers and partners with information about their products and Web services. The UDDI registry also enables businesses to integrate into each other's systems and processes. Registering enables a business to publicly list basic information about its company and offerings. There is also the option to list a catalog of products, services and guidelines for engagement. Registered businesses and their catalogs of services and products are then accessible in searches by potential buyers. Details of the UDDI registry and its searching protocol can be found in the following online papers:

UDDI Executive White Paper, Sep. 6, 2000, http://www.uddi.org/pubs/UDDI_Executive_White_Paper.pdf UDDI Technical White Paper, Sep. 6, 2000, http://www.uddi.org/pubs/Iru_UDDI_Technical_White_Paper.pdf UDDI Programer's API 1.0, UDDI Open Draft Specification 30 Sep. 2000, by Toufic Boubez, et al., http://www.uddi.org/pubs/ProgrammersAPI-V1-1.pdf UDDI Data Structure Reference, UDDI Open Draft Specification 30 Sep. 2000, by Toufic Boubez, et al., http://www.uddi.org/pubs/DataStructure-V1.pdf Mobile phones and wireless personal digital assistants (PDAs) are able to access the Internet using the Wireless Application Protocol (WAP). The Nokia WAP Client Version 2.0 is a software product containing the components necessary to implement a WAP client on a wireless device. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs stored in the wireless device interact with the WAP Client to implement a variety of communications applications. Details of the Nokia WAP Client Version 2.0 can be found in the online paper: Nokia WAP Client Version 2.0, Product Overview, Nokia Internet Communications, 2000, www.nokia.com/corporate/wap.

What is needed is the ability of a mobile phone or wireless PDA to discover Internet businesses and services by accessing the UDDI registry. It would be even more useful to facilitate the formation of a query to the UDDI registry for the wireless device user. It would be beneficial to maintain a personal profile of the user's Internet accessing preferences and to use that profile in formulating a detailed UDDI query of the UDDI registry from the user's abbreviated inputs to the wireless device.

In addition to discovering Internet and business services via UDDI, there is a further need to tailor business/service discovery to a particular geogrphic region or location. Coupled with existing locating technologies (e.g., Global Positioning System (GPS)), service discovery may be enabled to serve users with geographical interests. Through the use of user profiles, preferences, and/or handles, a geographically focused UDDI search may be implemented on a wireless device with relative speed and convenience.

SUMMARY OF THE INVENTION

In accordance with the invention, a method is disclosed to enable a mobile phone or wireless PDA to discover Internet businesses and services in a specified geographical location by accessing the Universal Description, Discovery and Integration (UDDI) registry. The method facilitates the formation of a query to the UDDI registry for the wireless device user. The query is typically appended with a user location. The location may be automatically inserted through a locating device, or may be inputted manually by the user. The method constructs a personal user profile of the user's UDDI searching strategies and Internet accessing preferences. The user profile can be used as a shortcut for online or offline queries to the UDDI registry or for accessing pages from web sites, in response to the user's entry of abbreviated inputs to the wireless device. The method also includes a user location profile, in which the user may store or otherwise indicate geographical preferences. The location profile can also be used as a shortcut for queries. The method is embodied as programmed instructions which may be executed within the user's wireless device to query the UDDI registry. Alternately, a method is embodied as programmed instructions that may be executed within a separate knowledge engine server to query the UDDI registry in response to commands from the user's wireless device. The server can be used to cache files accessed from web sites, for selective forwarding to the user's wireless device.

In one aspect of the invention, the sequence of operational steps for the wireless device's UDDI registry browsing method begins by entering a search handle that will be associated with the user's search strategy. The user may additionally specify a geographic location, or have the wireless device transmit a geographical coordinate. The query terms are then entered by the user, which may be a business name, part of a business name, a service description, or other characterization. If the user wishes to focus the search to a geographic location, the query will then be linked with the geographic location prior to, or sent along with the geographic location during transmission. If the characterization is part of a business name, the wireless device then sends a find_business XML inquiry using Simple Object Access Protocol (SOAP) to the UDDI registry with the appended location. The wireless device then receives back from the UDDI registry, a businessList message that contains a list of business names satisfying the find_business query under the specified location. The user can then select an item from the returned businessList message and drill-down in the selected business' entity data.

The wireless device then sends a find_service XML inquiry using SOAP to the UDDI registry with the appended location. The wireless device then receives back from the UDDI registry, a serviceList message that contains a list of names of services offered by the selected business. The user can then select an item from the returned serviceList message and drill-down in the selected service data.

The wireless device then sends a _get_serviceDetail_XML inquiry using SOAP to the UDDI registry. The wireless device then receives back from the UDDI registry, a serviceDetail message that includes bindingTemplate data that contains the details of the selected service. The list of service details may be sent according to an established hierarchy, or may alternately be sent without a specified regiment or priority. Included in the bindingTemplate data is the accessPoint URL, which is the URL of the selected service on the web site of the selected business.

The wireless device then displays the accessPoint URL to the user. The wireless device also stores the search handle in user profile with the selected accessPoint URL, to enable the user to access web pages from the web site of the selected business. This provides the user with a shortcut for accessing pages from web sites, in response to the user's entry of abbreviated search handle to the wireless device.

The wireless device also stores the search and/or location handle in user profile with the UDDI registry search strategy. The stored location may be an address, region, landmark, GPS location, triangulated location or other means capable of identifying a geographic location. The stored search strategy includes the business name query, the selected businessEntity data, the selected businessService data, the selected bindingTemplate data, and the selected accessPoint URL. This provides the user with a shortcut for online or offline queries to the UDDI registry, in response to the user's entry of abbreviated search handle to the wireless device. The user may also opt to save only the query term, in order to search a particular class of businesses that may be geographically independent of each other (i.e., regional businesses). The search handle and/or locator handle may also be associated with a graphical icon on the user's screen, so the user may access the handles with greater efficiency.

To replay a UDDI registry search strategy, the user merely enters a search handle into the wireless device and selects the replay option. The wireless device then accesses the UDDI registry search strategy from user profile corresponding to the search handle and loads the business name query, the selected businessEntity data, the selected businessService data, and the selected bindingTemplate data as each respective operand that would have been otherwise entered by the user. If the data in the UDDI registry has been updated since the user's last query, the bindingTemplate data may contain additional or modified accessPoint URLs, of the selected service on the web site of the selected business.

To replay a regional UDDI search strategy, the location handle is entered along with the saved query terms. The saved query terms may be entered independently, or may be stored under a search handle. Once the location handle and saved query are entered, the replay option may then be selected. Once selected, the wireless device then accesses the UDDI search strategy and location from the user profile and loads the business name query. The device then appends the location to the query and transmits the search. Under this embodiment, specific query terms may be combined with varying locations or location handles.

In another aspect of the invention, the sequence of operational steps described above for the wireless device's UDDI registry browsing method can also be carried out in a separate knowledge engine server. The server performs the above described method to query the UDDI registry in response to commands from the user's wireless device from a specified location. The knowledge engine in the server begins by receiving user's location and query or search handle. If a search handle has been received, then the server replays a corresponding search strategy for the UDDI registry accessed from the user's profile and uses the query steps specified in the strategy instead of requesting further inputs from the user. If a location handle has been received, the server may replay the search under the specified location handle.

If, however, the knowledge engine server has received a new user query, the server then accesses the UDDI registry using the method described above to identify web sites in accordance to the user location. The server returns a list of web sites to the user and stores binding templates in the user's profile. The server then receives the user's selection of web sites to search and the server updates user profile with these preferences.

Whether the server begins by receiving the user's new query or the user's search handle, the server proceeds to search the identified web sites using the URLs contained in the stored binding templates. The server retrieves any documents resulting from the search of the specified web sites. The server applies a filter that is prescribed by the user and stored in the user's profile, to limit the returned documents to only those of particular interest to the user. The server sorts the documents in a list having an order established in accordance with user's profile. The server further stores the filtered documents and the sorted list in a cache for later use. The documents may subsequently be accessed selectively by the user. The server also returns the list of documents to user, and if the user is not logged on, the list will be returned to the user when he/she next logs on.

The server receives the user's selections from the list and it updates the user's profile with the user's preferences. The server then returns the selected documents to user. As was described above, the knowledge engine server associates the search handle with user's selections and with the user's search strategy, storing that association in user's profile. Similarly, the user's last registered or entered location is stored and updated in the user's profile. Thus, any subsequent queries may be adjusted to a user location.

DESCRIPTION OF THE FIGURES

FIGS. 1A through 1H show the user's wireless device in a progression of stages as it carries out a location-specific UDDI registry browsing method;

FIGS. 1I and 1J show the user's wireless device in a progression of stages as it carries out the method of replaying a location-specific UDDI registry search strategy as a shortcut for online or offline queries to the UDDI registry;

FIG. 2 is a functional block diagram of the wireless device 100, showing its various components and programs;

FIG. 2A is a flow diagram of the sequence of operational steps for the wireless device's location-specific UDDI registry browsing program;

DISCUSSION OF THE PREFERRED EMBODIMENT

Figure 1:
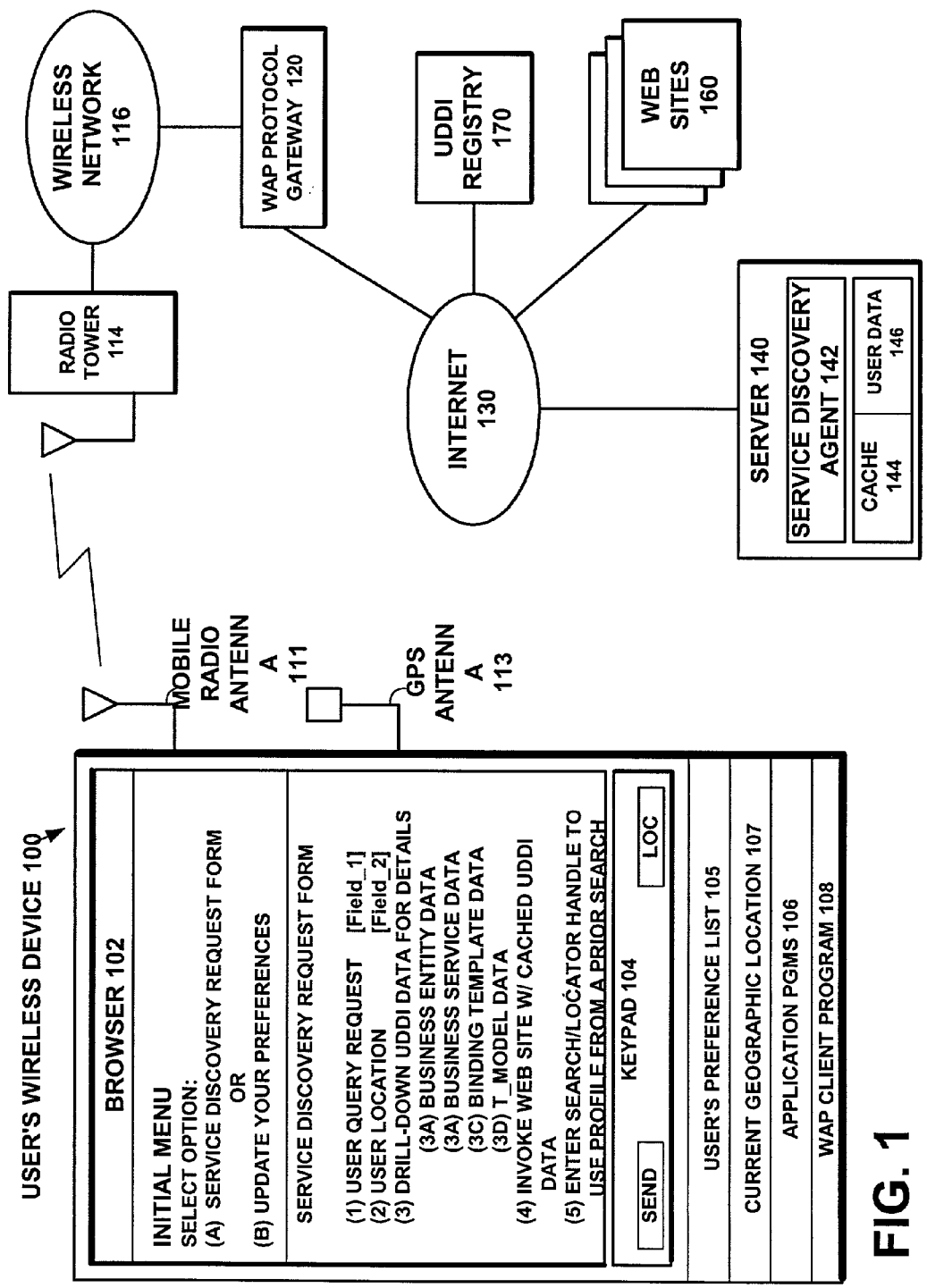
FIG. 1 is a network diagram of the invention, showing an exemplary relationship between the user's GPS Wireless Application Protocol (WAP)-enabled portable wireless device, the WAP protocol gateway to the Internet, the knowledge engine server, the Universal Description, Discovery and Integration (UDDI) registry, and a plurality of web sites.

The invention is applied to wireless telephones and wireless personal digital assistants (PDAs) implementing the Wireless Application Protocol (WAP) standard. FIG. 1 is a network diagram of an embodiment of the invention, illustrating a relationship between the user's Wireless Application Protocol (WAP)-enabled portable wireless device 100, a WAP protocol gateway 120, and the server 140. The user's WAP-enabled portable wireless device 100 can be a wireless mobile phone, pager, two-way radio, smartphone, personal communicator, or the like. The wireless device 100 may also be enabled with a GPS antenna 113, which provides user location information along with the service discovery request. It is understood that while an integrated GPS antenna is illustrated, a variety of user-location devices or techniques may be employed to establish user locations (e.g., radio beacon triangulation sensor, Bluetooth™ devices, etc.). An example may be found in European Patent EP 0 767 594 A2, entitled "Mobile Station Positioning System." Additional information on Bluetooth™ communication is provided in a book by Nathan J. Muller entitled "Bluetooth Demystified", published by McGraw Hill, 2000 (ISBN 007-1363238). Furthermore, while the embodiments disclosed below are based in a WAP environment, is also understood that the function and execution of the present invention is obtainable under other wireless protocols as well (e.g., XHTML)

The user's WAP-enabled portable wireless device 100 accesses a small file called a deck which is composed of several smaller pages called cards which are small enough to fit into the display area of the device's microbrowser 102. The small size of the microbrowser 102 and the small file sizes accommodate the low memory constraints of the portable wireless device 100 and the low-bandwidth constraints of a wireless network 116. The cards are typically written in the Wireless Markup Language (WML) which is specifically devised for small screens and one-hand navigation without a keyboard. The WML language is scaleable from two-line text displays on the microbrowser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages. The Nokia WAP Client Version 2.0 is a software product containing the components necessary to implement a WAP client on a wireless device. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs stored in the wireless device interact with the WAP Client to implement a variety of communications applications. Details of the Nokia WAP Client Version 2.0 can be found in the online paper: *Nokia WAP Client Version 2.0, Product Overview*, Nokia Internet Communications, 2000, www.nokia.com/corporate/wap.

The user's WAP-enabled portable wireless device 100 communicates with the radio tower 114 and can exchange messages for distances up to several kilometers. The types of wireless networks 116 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like. As mentioned previously, the wireless device is further enabled to determine user location via the GPS antenna 113. The device may alternately possess location capabilities through base station triangulation, connection through a Bluetooth™ net (both of which are well-known in the art), or any equivalent means. A service discovery agent may also be invoked, where the agent would request location coordinates from a location server using a Location Forum (LIF) Application Program Interface (API) (see http:\\www.locationforum.org).

The overall process of communication between the user's WAP-enabled wireless device (the client or user) 100, through the WAP protocol gateway 120, to the server 140 resembles the way Web pages are served on the Internet using the HyperText Transfer Protocol (HTTP) or World Wide Web protocol:

[1] The user presses a key on the user's device 100 related to the Uniform Resource Locator (URL) of the server 140.

[2] The user's device 100 sends the URL, via the radio tower 114 and the wireless network 116, to the gateway 120 using WAP protocols.

[3] The gateway 120 translates the WAP request into an HTTP request and sends it over the Internet 130 to the server 140, via Transmission Control Protocol/Internet Protocol (TCP/IP) interfaces.

[4] The server 140 handles the request just like any other HTTP request received over the Internet. The server 140 either returns a WML deck or a HyperText Markup Language (HTML) page back to the gateway 120 using standard server programs written, for example in Common Gateway Interface (CGI) programs, Java servlets, or the like.

[5] The gateway 120 receives the response from the server 140 on behalf of the user's device 100. If the response is an HTML page, it gets transcoded into WML if necessary. Then the WML and WMLScript coding is encoded into a byte code that is then sent to the user's device 100.

[6] The user's device 100 receives the response in the WML byte code and displays the first card in the deck on the microbrowser 102 to the user.

In FIG. 1, the protocol gateway 120 includes a WAP protocol stack organized into five different layers (not shown). An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, "Professional WAP", published by Wrox Press Ltd., 2000 (ISBN 1-861004-04-1).

In FIG. 1, the user's portable wireless device 100 includes the microbrowser 102 displaying the Mobile Web Services menu, that enables the user to navigate through the cards being displayed and to select options that are programmed by the application programs 106. The user's device 100 also includes the WAP client program 108 which has been previously discussed. Additionally, the wireless device is equipped with a keypad 104 which may be a alphanumeric keypad, a "QWERTY" keypad, or any other keypad layout that may be proprietary to the device being used. Typically the keypad will possess a "Send" key which may be used to initiate transmission. Additionally, a "Loc" key is preferably disposed on the keypad to allow a user to efficiently register the location of the user and append the location to a subsequent query. Typically, the "Loc" key is communicatively coupled with the locating means (e.g., GPS), wherein the depression of the "Loc" key stores the user coordinates in a current geographic locator 107. The coordinates may subsequently be appended to UDDI search requests. The location may also be stored into a user preference list 105, wherein various user locations may be recalled.

Figure 2B:
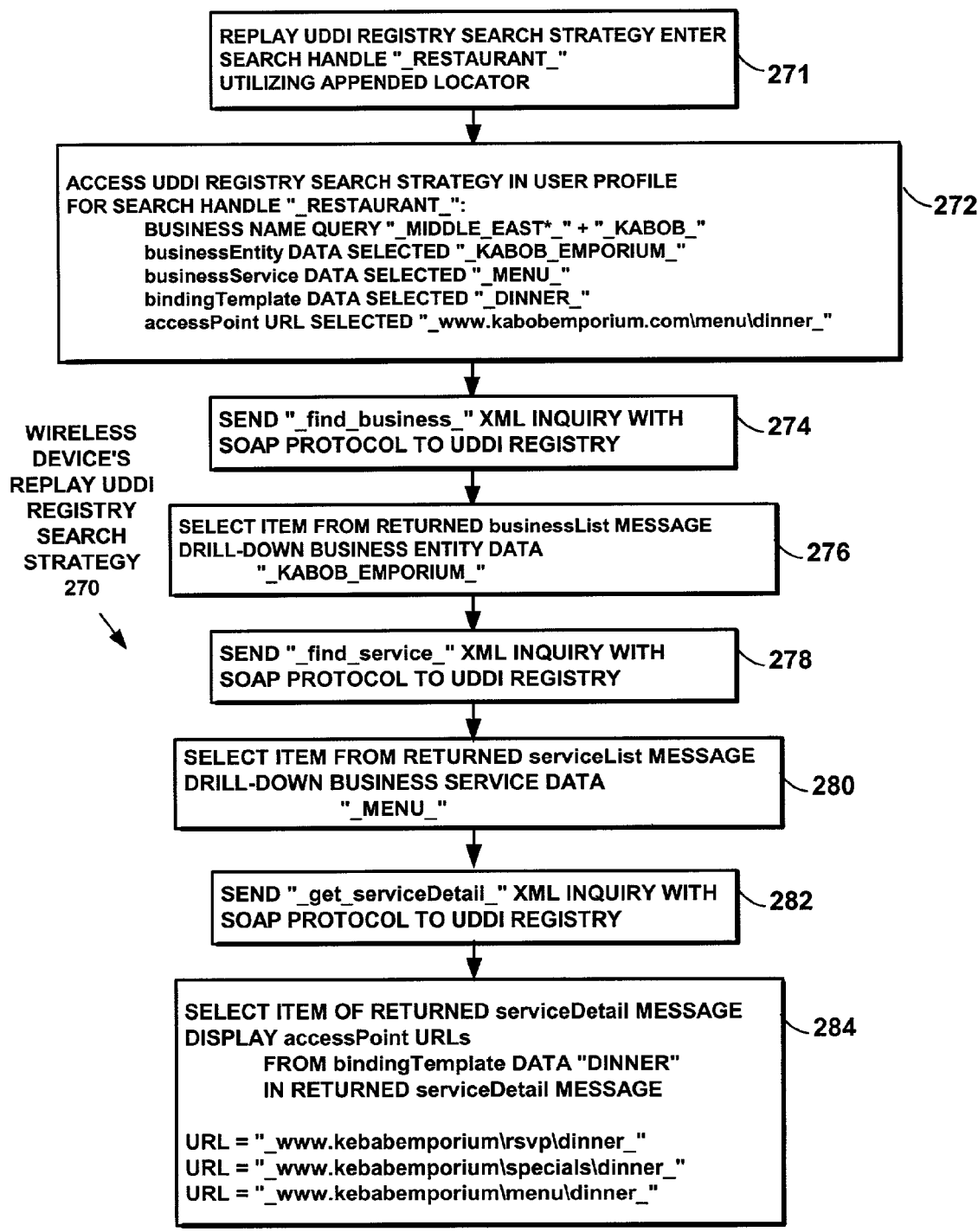
FIG. 2B is a flow diagram of the sequence of operational steps for the wireless device's program to replay the location-specific UDDI registry search strategy.

The Mobile Web Services menu displayed by the microbrowser 102 in FIG. 1 is rendered by the WAP client program 108 under the control of the application programs 106, which are further illustrated in FIGS. 2, 2A, and 2B. The user can select the session type utilizing the Mobile Web Services menu, by either [A] a direct session with the UDDI registry or [B] an indirect session with the UDDI registry through a knowledge server 140. The direct session with the UDDI registry is further illustrated in the network process flow diagrams of FIGS. 3A and 3B. The indirect session with the UDDI registry through the knowledge server 140 is further illustrated in the network process flow diagram of FIG. 4B. Whichever session type is selected by the user, the Mobile Web Services menu of FIG. 1 presents to the user the UDDI Registry Search Menu from which the user can select the following options:

[1] USER QUERY REQUEST
[2] USER LOCATION
[3] DRILL-DOWN UDDI DATA FOR DETAILS
   [2A] BUSINESS ENTITY DATA
   [2B] BUSINESS SERVICE DATA
   [2C] BINDING TEMPLATE DATA
   [2D] T_MODEL DATA
[4] INVOKE WEB SITE W/ CACHED UDDI DATA
[5] ENTER SEARCH/LOCATOR HANDLE TO USE PROFILE FROM A PRIOR SEARCH

Option [1] of user query request involves query terms for browsing the UDDI registry for web site URLs. This browsing allows the user to explore and examine data organized by the UDDI registry in a hierarchy. The core information model used by the UDDI registries is defined in an XML schema. XML allows hierarchical relationships to be described for four types data: business information; service information, binding information; and information about specifications for services.

A first type of data is business information, which is specified in the UDDI registry with the businessEntity XML element. The businessEntity XML element typically includes the name, general description, contacts, and categories of the business whose web site is on the Web. The businessEntity XML element serves as the top of the information hierarchy for all of the information about a business under the present embodiment.

A second type of data is Service information, which is specified in the UDDI registry with the businessService XML element. One or more businessService XML elements is contained in each businessEntity XML element. The businessService XML element includes one or more bindingtemplate XML elements, which are a third type of data. The businessService XML element is a descriptive container that is used to group a series of related Web services related to either a business process or category of services, such as purchasing services, shipping services, news services, and other high-level business processes. The businessService XML element information sets can each be further categorized in combinations of industry, product and service or geographic subjects.

The bindingTemplate XML element contains the detailed technical descriptions of Web services. As such, these structures provide the technical entry point URL for specific services and products offered by a business. Each bindingTemplate XML element structure has a single logical businessService XML element parent, which in turn has a single logical businessEntity XML element parent. An important piece of information in the bindingTemplate XML element is the accessPoint element. The accessPoint element is the URL of a specific service provided by the business. A single attribute is typically provided, and is identified in the present embodiment as URLType. The purpose of the URLType attribute is to facilitate searching for entry points associated with a particular type of service. An example might be a purchase order service that provides three entry points, one for HTTP, one for SMTP, and one for FAX ordering. In this example, a businessService XML element contains three bindingTemplate XML element entries, each with identical data with the exception of the accessPoint value and URLType value.

A fourth type of data in the UDDI registry is the tModel XML element, which is pointed to by a pointer in the bindingTemplate XML element. The tModel XML element specifies the protocols, interchange formats and interchange sequencing rules for accessing web pages from the business' server having the service information specified in the businessService XML element.

Figure 3A:
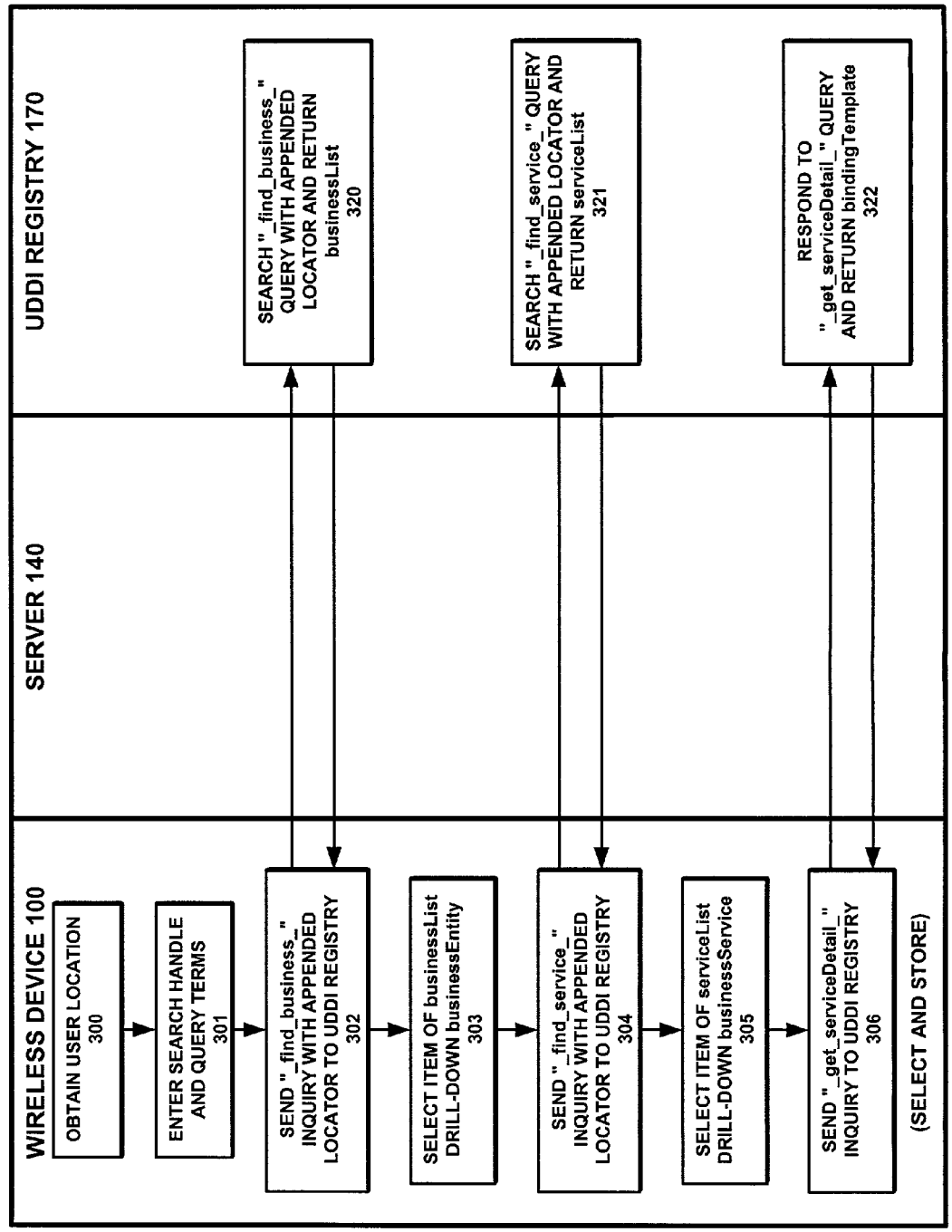
FIG. 3A is a network process flow diagram of the interaction of the wireless device and the UDDI registry when carrying out the location-specific UDDI registry browsing program of FIG. 2A.

Option [1] of the Mobile Web Services menu of FIG. 1, is:
   [1] USER QUERY REQUESTS Option [1] for the user query request of browsing the UDDI registry for web site URLs involves starting with some broad information, appending a locator, performing a search, finding general result sets for that location and then selecting more specific information for drill-down. The UDDI registry accommodates the browse pattern with the find_xx API call. These calls form the search capabilities provided by the UDDI registry and are matched with return messages that return overview information to match the supplied search criteria. A typical browse sequence may involve finding whether a particular business has any information registered in the UDDI registry. This sequence would start with a call find business, and may subsequently pass the first few characters of the businesses name. The UDDI registry would then return a businessList result. The businessList result is a list of overview information (keys, names and description) of the businessEntity information that matched the search results returned by the find_business query. FIGS. 1A through 1H illustrate the user's wireless device in a progression of stages as it carries out the UDDI registry browsing method. FIG. 2A illustrates a flow diagram of the sequence of operational steps for the wireless device's UDDI registry browsing program. FIG. 3A illustrates a network process flow diagram, showing the interaction of the wireless device and the UDDI registry when carrying out the UDDI registry browsing program of FIG. 2A.

Option [2] of the Mobile Web Services menu of FIG. 1, is:

[2] USER LOCATION

When the user activates the wireless device under the present invention, the user may specify for the wireless device to enable user location identification. Alternately, the user may manually specify a location into the wireless device from which the queries will focused to (an example of the location initiation can bee seen in FIGS. 1A–B). A user service profile may be associated with the user preference list 105, and may be subsequently updated via the geographic location 107 of the user. The location information may be automatically appended or pasted into the search under the present invention to a user location input field. The system may be further enabled with macros to tailor geographic searches according to items such as street address, zip code, telephone area code/number, city, country, geographic region or even unique landmark location (e.g., Eiffel Tower, Empire State Building, Golden Gate Bridge, etc.)

Option [3] of the Mobile Web Services menu of FIG. 1, is:

[3] DRILL-DOWN UDDI DATA FOR DETAILS
 [3A] BUSINESS ENTITY DATA
 [3B] BUSINESS SERVICE DATA
 [3C] BINDING TEMPLATE DATA
 [3D] T_MODEL DATA

After the user has identified a business he/she has been browsing for in Option [1], along with the location [2], the user can drill-down into their businessService information. Here, the user may search for particular service types for the location (e.g. purchasing, shipping, news and the like) using the find_service API call. Similarly, if the user knows the technical fingerprint (tModel signature) of a particular product and wants to see if the business he/she has chosen supports a compatible service interface, the user can use the find-binding API call.

Once the user has a key for one of the four main data types managed by the UDDI registry, he/she can use that key to access the full registered details for a specific data type (businessEntity, businessService, bindingTemplate, or tModel). The full registered information for any of these structures can be accessed by passing a relevant key type to one of the get_xx API calls to the UDDI registry.

Continuing with the example on browsing, one of the data items returned by all of the find L-xx return sets is key information. In the case of a business that the user is interested in for that location, the businessKey value returned within the contents of a businessList structure can be passed as an argument to the UDDI registry to get_businessDetail. The successful return of this message is a businessDetail message containing the full registered information for the entity whose key value was passed. This typically will be a full businessEntity structure. Since full businessEntity structures can contain a large quantity of information, it can be optionally cached in the cache 144 of the knowledge engine server 140 of FIG. 1.

Option [4] of the Mobile Web Services menu of FIG. 1, is:

[4] INVOKE WEB SITE W/CACHED UDDI DATA

After the user has retrieved the businessEntity structure from the UDDI registry 170 of FIG. 1, the user can access the accessPoint element of the bindingTemplate XML element in the businessEntity structure to obtain the URL of a specific service provided by the business. Option [4] invokes the business' web site 160 with the cached URL to access the desired web pages. Since the accessed web pages from the web site 160 can contain a large quantity of information, it can be optionally cached in the cache 144 of the knowledge engine server 140 of FIG. 1. Furthermore, if the bindingTemplate is used to contact services directly at the accessPoint, and a failure occurs, the terminal will typically use the bindingTemplate ID to fetch new bindingTemplate information from the UDDI registry, assuming that the new information is up-to-date in relation to the service.

Option [5] of the Mobile Web Services menu of FIG. 1, is:

[5] ENTER SEARCH/LOCATION HANDLE TO USE PROFILE FROM A PRIOR SEARCH

Figure 3B:
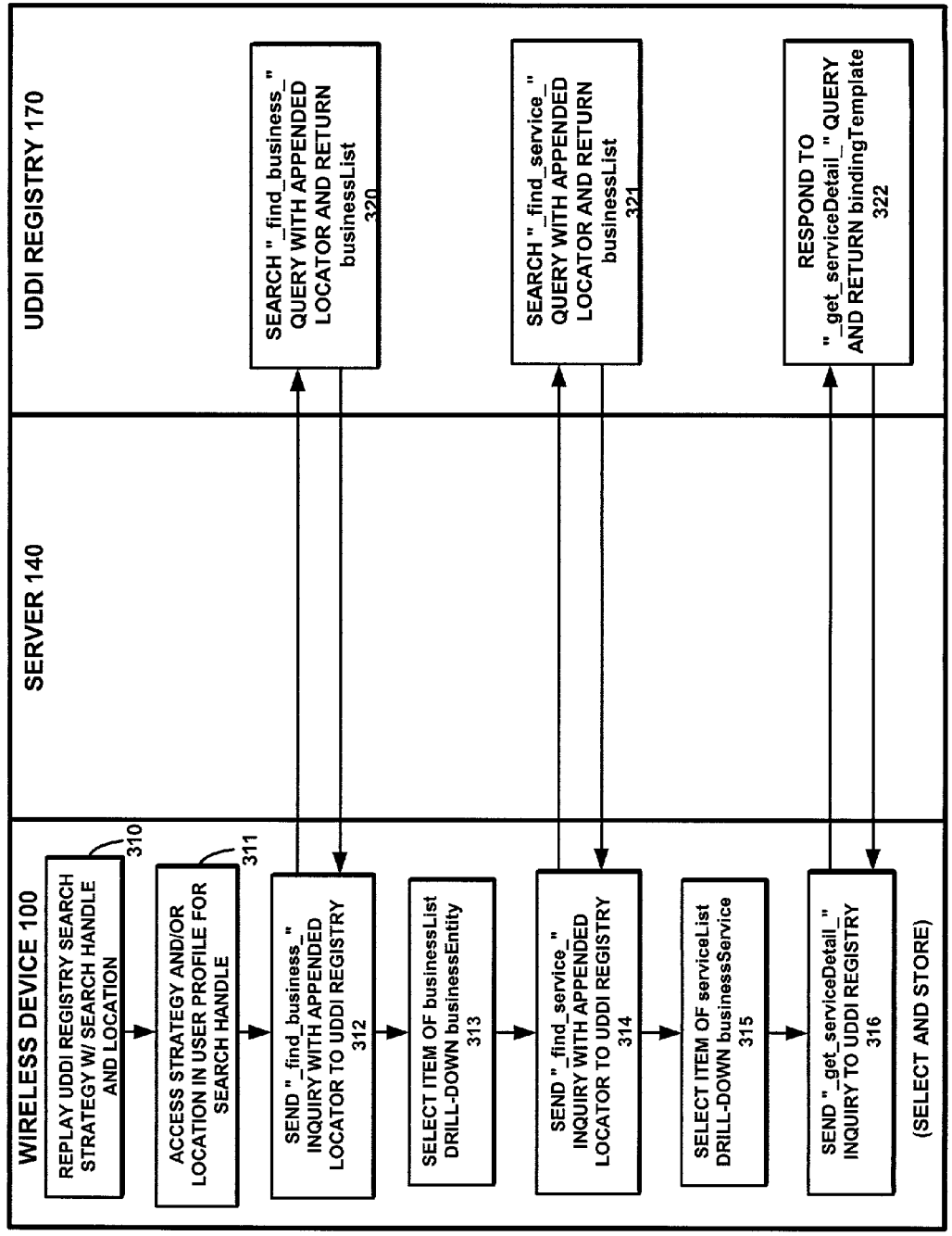
FIG. 3B is a network process flow diagram of the interaction of the wireless device and the UDDI registry when carrying out the program to replay the location-specific UDDI registry search strategy.

Option [5] enables the user to replay a prior UDDI registry search strategy and/or location. The user typically enters a previously used search or location handle into the wireless device and selects the replay Option [5]. The wireless device then accesses the UDDI registry search strategy from the user's stored profile corresponding to the search handle and loads the business name query, the selected businessEntity data, the selected businessService data, and the selected bindingTemplate data as each respective operand that would have been otherwise entered by the user. If the data in the UDDI registry has been updated since the user's last query, the bindingTemplate data may contain additional or modified accessPoint URLs, of the selected service on the web site of the selected business. FIGS. 1I and 1J illustrate the user's wireless device in a progression of stages as it carries out the method of replaying a UDDI registry search strategy as a shortcut for online or offline queries to the UDDI registry. FIG. 2B discloses a flow diagram of the sequence of operational steps for the wireless device's program to replay the UDDI registry search strategy. FIG. 3B is a network process flow diagram of the interaction of the wireless device and the UDDI registry when carrying out the program to replay the UDDI registry search strategy.

The search strategy may also be saved as a quick-link for query terms. This is particularly advantageous when using various user locations or handles. Since business information tends to be location specific, a search retrieving UDDI information for one location (e.g., Europe) may result in a null set error for a different location (e.g., United States). Thus, if a user is moving from one location to another, the core search terms are re-transmitted with the updated location information pasted in the user location information field.

Figure 1B:
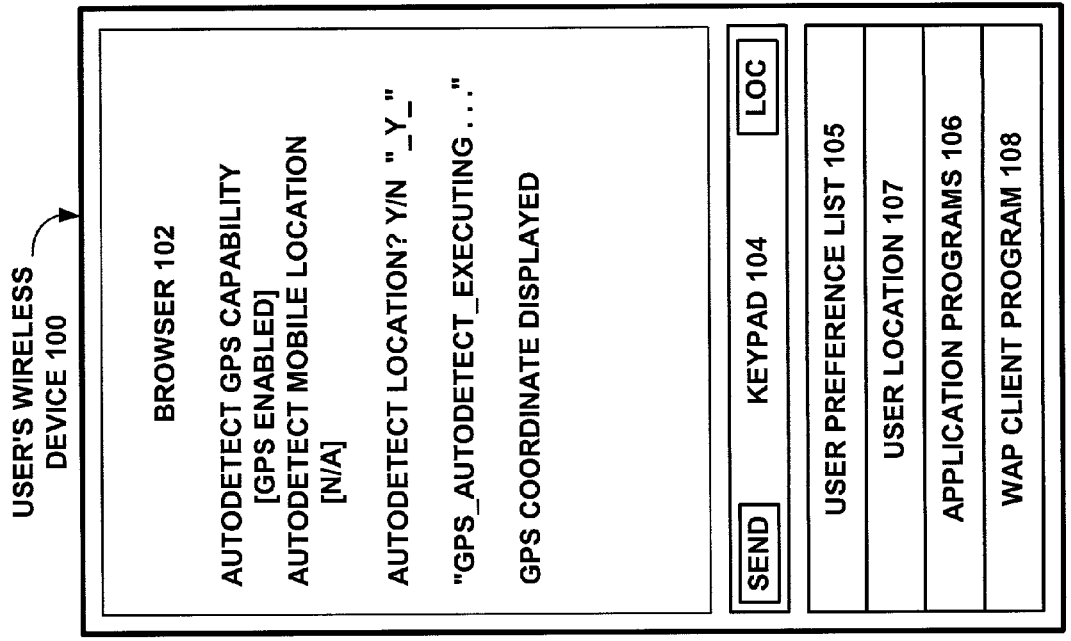
Figure 1A:
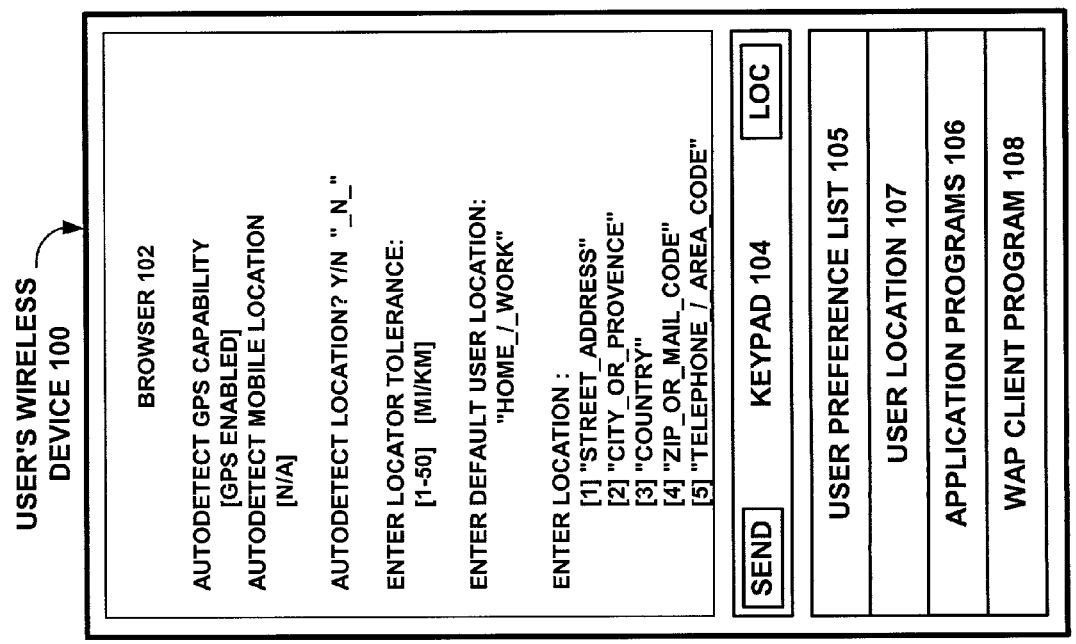

The sequence of operational steps for the wireless device's UDDI registry browsing method are shown in FIG. 2A. The Mobile Web Services menu of FIG. 1A begins by initializing the user's location. under the example shown the wireless device is GPS enabled, the user has activated the GPS tracking to allow the device to append location coordinates. Alternately, the user could enable other means for wireless location (e.g., mobile triangulation location). In the preferred embodiment, however, the device utilizes a single means of location at one time. The user may then indicate a locator tolerance, which serves to filer information that is deemed outside the geographical tolerances. The user may further indicate a default location for the device or enter a more specific location from which the queries will be entered from. In FIG. 1B, the user indicates to the device that GPS coordinates are automatically detected and displayed.

The menu continues to FIG. 1C, where the user enters a location handle from which the appended locator information may be stored. The location handle may also be instructed to automatically update itself as the user changes locations under the search handle that will be associated with the user's search strategy. The user may then enter a search handle that will be associated with the user' search strategy. The query terms are subsequently entered by the user, which may be a business name, part of a business name, a service description, or other characterization. If the characterization is part of a business name, the wireless device then sends a find_business XML inquiry using Simple Object Access Protocol (SOAP) to the UDDI registry with an appended locator. The wireless device then receives back from the UDDI registry, a businessList message shown in the Mobile Web Services menu of FIG. 1D, that contains a list of business names or organizations satisfying the find_business query which satisfied the locator tolerance. The user can then select an item from the returned businessList message and drill-down in the selected business' entity data.

Figure 1F:
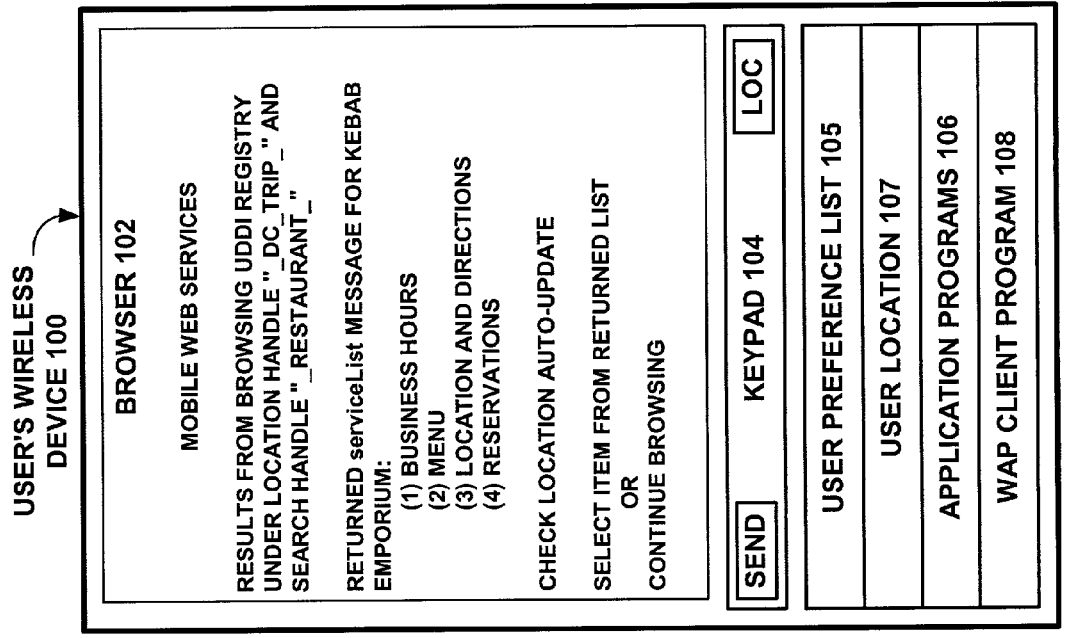
Figure 1E:
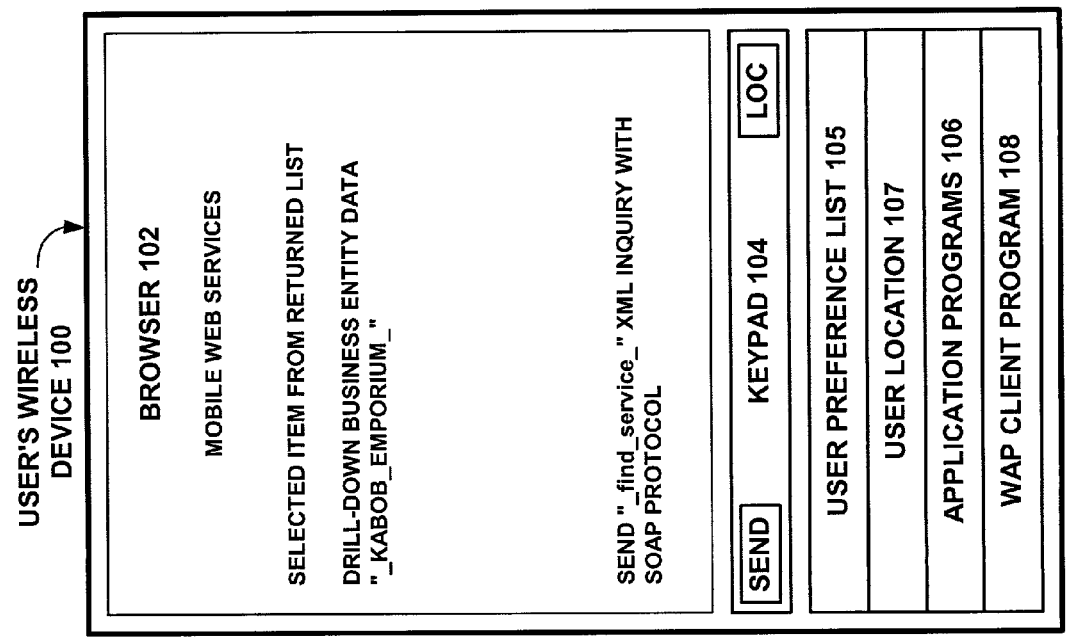
Figure 1H:
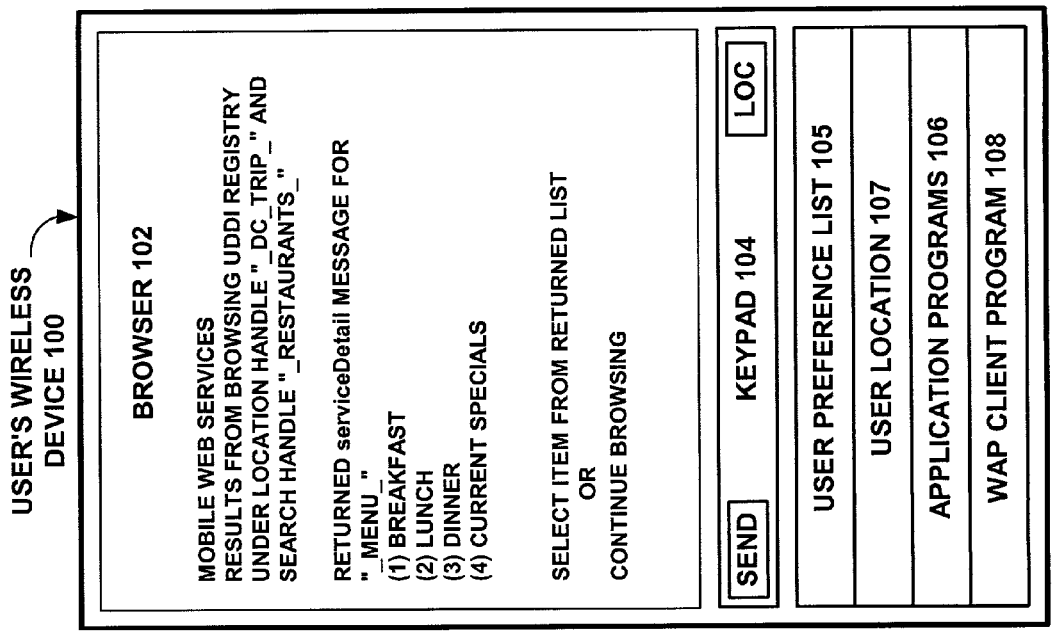

The Mobile Web Services menu of FIG. 1E shows the wireless device then sending a find_service XML inquiry using SOAP to the UDDI registry. The Mobile Web Services menu of FIG. 1F shows the wireless device then receiving back from the UDDI registry, a serviceList message that contains a list of names of services offered by the selected business. The user can then select an item from the returned serviceList message and drill-down in the selected service data, as shown by the Mobile Web Services menu of FIG. 1G.

Figure 1G:
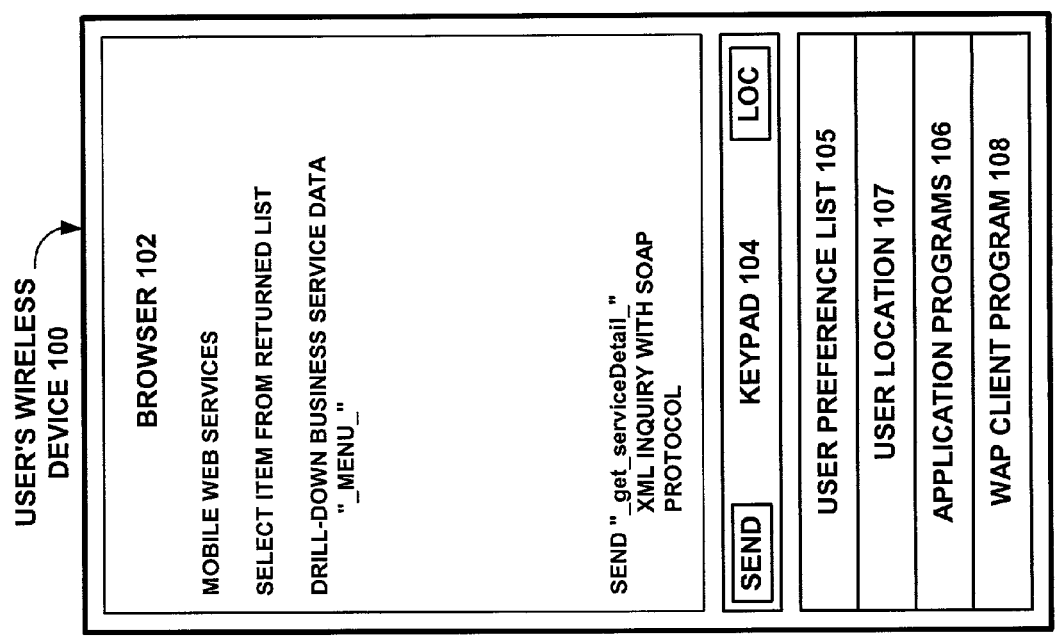

The wireless device then sends a get_serviceDetail_XML inquiry using SOAP to the UDDI registry, as shown by the Mobile Web Services menu of FIG. 1G. The Mobile Web Services menu of FIG. 1H then shows the wireless device receiving back from the UDDI registry a serviceDetail message that includes bindingTemplate data that contains the details of the selected service. Included in the bindingTemplate data is the accessPoint URL, which is the URL of the selected service on the web site of the selected business.

The Mobile Web Services menu of FIG. 1I shows the wireless device displaying the accessPoint URL to the user. The Mobile Web Services menu of FIG. 1J shows that the serviceDetail message can contain one or a plurality of URLs, depending on the number of matches made against the user's query in the search by the UDDI registry. The wireless device also stores the search handle in user profile/preference with the selected accessPoint URL, to enable the user to access web pages from the web site of the selected business. This provides the user with a shortcut for accessing pages from web sites, in response to the user's entry of abbreviated search handle to the wireless device.

In addition to the user location, the wireless device also stores the search handle in user profile/preference with the UDDI registry search strategy. The stored search strategy includes the business name query, the selected businessEntity data, the selected businessService data, the selected bindingTemplate data, and the selected accessPoint URL. This provides the user with a shortcut for online or offline queries to the UDDI registry, in response to the user's entry of abbreviated search handle to the wireless device.

Figure 1L:
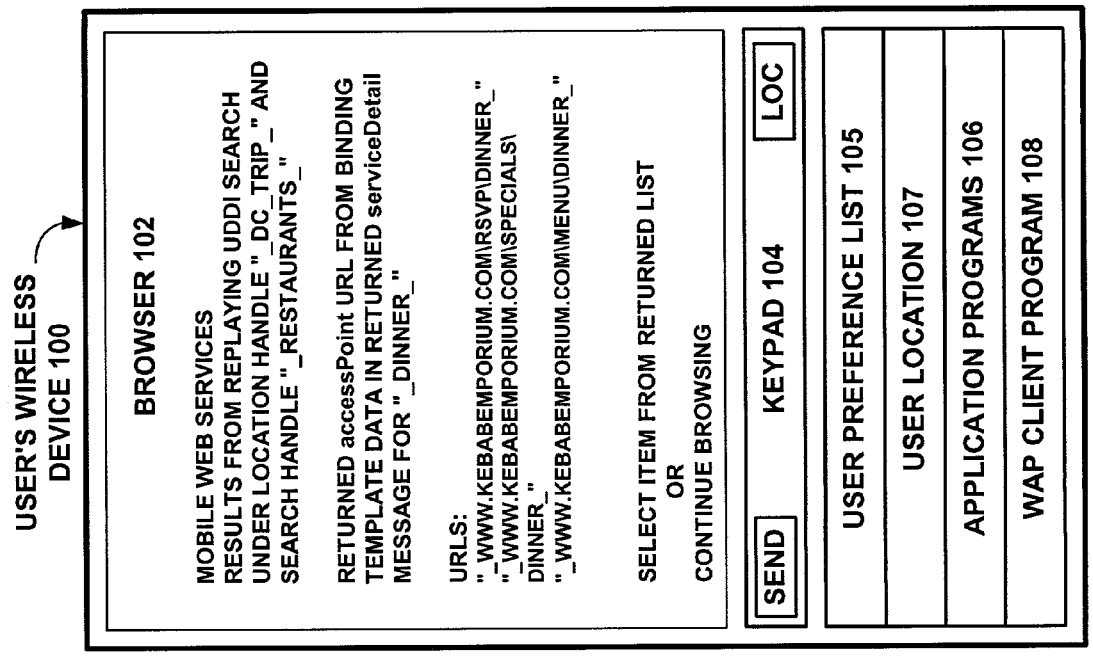
FIGS. 1K and 1L show the Mobile Web Services menu.
Figure 1K:
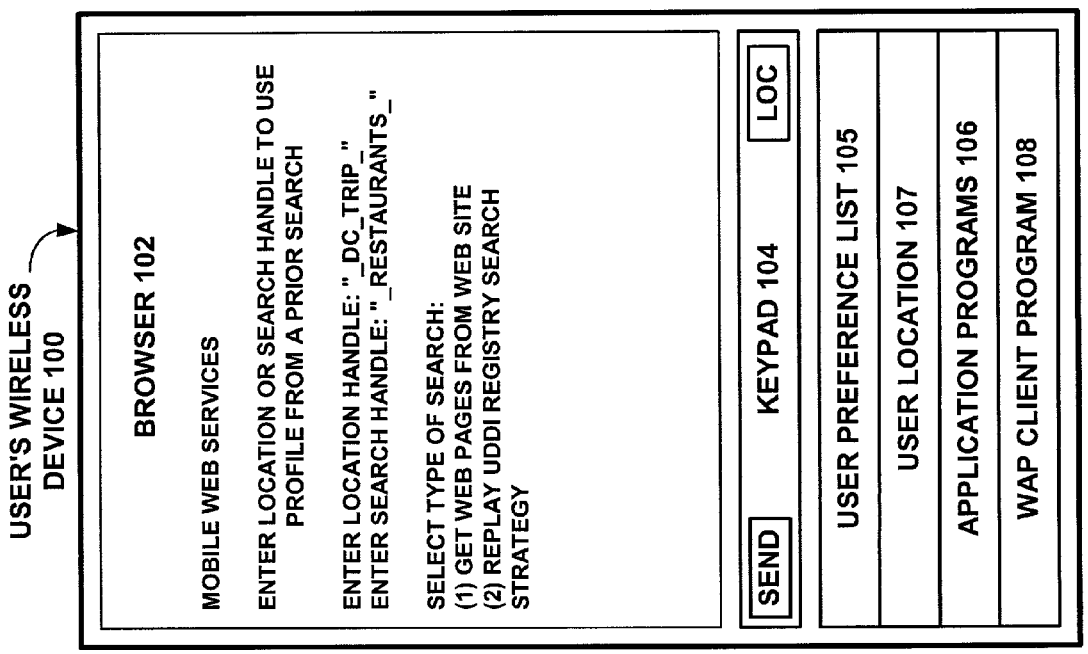

To replay a UDDI registry search strategy, the user enters a search handle into the wireless device and selects the replay option, as shown in the Mobile Web Services menu of FIG. 1K. The wireless device then accesses the UDDI registry search strategy from user profile corresponding to the search handle and loads the business name query, the selected businessEntity data, the selected businessService data, and the selected bindingTemplate data as each respective operand that would have been otherwise entered by the user. If the data in the UDDI registry has been updated since the user's last query, the bindingTemplate data may contain additional or modified accessPoint URLs, of the selected service on the web site of the selected business, as shown by the Mobile Web Services menu of FIG. 1L. Alternately, if the search handle is replayed in a different location, the user may specify a "regional search handle", wherein the search handle consists only of query terms, and those terms are subsequently retransmitted using the new appended locator.

FIG. 2 is a functional block diagram of the wireless device 100, and illustrates its various components and programs. FIG. 2 discloses the memory 202 connected by means of the bus 204 to the radio 206, the keypad 104, the central processor 210 and the display 212. The memory 202 contains program modules each consisting of a sequence of programmable instructions. The wireless devices UDDI registry browsing program 240 (see FIG. 2A) is stored in the memory 202. The wireless devices replay UDDI registry search strategy program 270 (see FIG. 2B) is also stored in the memory 202. The indirect session thru server program 220 is also stored in the memory 202.

User data 222 is stored in the memory 202, which includes the user ID 230, the user profile 232, and the user location 233. The user profile 232 includes the user's name and email address, the user's search handles, the UDDI search strategies, the sorting and filtering specifications, selected URLS, selected document titles and binding templates which contain URLS. The user location 233 includes the device's GPS location, cell ID location, triangulated location, manually entered location and landmark location. Also contained in the memory 202 of FIG. 2 is the cache 224 wherein documents and lists returned from a website, can be stored. In addition, the WAP client program 108, user location 107, and user profiles/preferences 105 are stored in the memory 202.

FIG. 2a is a flow diagram disclosing the sequence of operational steps for the wireless device's UDDI registry browsing program 240. The steps depicted in FIG. 2A are as follows:

Step 250: WIRELESS DEVICE BROWSING UDDI REGISTRY
ENTER LOCATION HANDLE "_DC_TRIP_"
ENTER SEARCH HANDLE "_RESTAURAUNT_"
Step 252: ENTER QUERY TERMS "_MIDDLE_E-AST*_"+"KABOB_"
IS THIS A BUSINESS NAME? Y/N "_Y_"
IS THIS A SERVICE NAME? Y/N "_N_"

Step 254: SEND "_find_business_" XML INQUIRY WITH SOAP PROTOCOL TO UDDI REGISTRY WITH APPENDED LOCATOR Step 256: SELECT ITEM FROM RETURNED businessList MESSAGE DRILL-DOWN BUSINESS ENTITY DATA
"_KABOB_EMPORIUM_"

Step 258: SEND "_find_service_" XML INQUIRY WITH SOAP PROTOCOL TO UDDI REGISTRY WITH APPENDED LOCATOR Step 260: SELECT ITEM FROM RETURNED serviceList MESSAGE DRILL-DOWN BUSINESS SERVICE DATA
"_MENU_"

Step 262: SEND "_get_serviceDetail_" XML INQUIRY WITH SOAP PROTOCOL TO UDDI REGISTRY Step 264: SELECT ITEM OF RETURNED serviceDetail MESSAGE
DISPLAY accessPoint URL
FROM bindingTemplate DATA "MENU"
IN RETURNED serviceDetail MESSAGE
URL="_www.kebabemporium.com\menu_"

Step 266: STORE SEARCH HANDLE "_RESTAURANTS_" IN USER PROFILE WITH APPENDED LOCATOR HANDLE "_DC_TRIP_"
SELECTED
URL="_www.kebabemporium.com\menu_"

Step 268: STORE SEARCH HANDLE "_RESTAURANT_" WITH APPENDED LOCATOR HANDLE IN USER PROFILE WITH UDDI REGISTRY SEARCH STRATEGY:
BUSINESS NAME QUERY "_MIDDLE_EAST*_"+ "_KABOB_"
businessEntity DATA SELECTED "_KABOB EMPORIUM_"
businessService DATA SELECTED "_MENU_"
bindingTemplate DATA SELECTED "_DINNER_"
accessPoint URL SELECTED "_www.kebabemporium.com\menu\dinner_"

FIG. 2B shows a flow diagram of the sequence of operational steps for the wireless device's program to replay the UDDI registry search strategy. FIG. 2B includes the following steps:

Step 271: REPLAY UDDI REGISTRY SEARCH STRATEGY ENTER SEARCH HANDLE "_RESTAURANT_" UTILIZING APPENDED LOCATOR Step 272: ACCESS UDDI REGISTRY SEARCH STRATEGY IN USER PROFILE FOR SEARCH HANDLE "_RESTAURANT_":
BUSINESS NAME QUERY "_MIDDLE_EAST*_"+ "_KABOB_"
businessEntity DATA SELECTED "_KABOB_EMPORIUM_"
businessService DATA SELECTED "_MENU_"
bindingTemplate DATA SELECTED "_DINNER_"
accessPoint URL SELECTED "_www.kabobemporium.com\menu\dinner_"

Step 274: SEND "_find_business_" XML INQUIRY WITH SOAP PROTOCOL TO UDDI REGISTRY Step 276: SELECT ITEM FROM RETURNED businessList MESSAGE DRILL-DOWN BUSINESS ENTITY DATA
"_KABOB_EMPORIUM_"

Step 278: SEND "_find_service_" XML INQUIRY WITH SOAP PROTOCOL TO UDDI REGISTRY

Step 280: SELECT ITEM FROM RETURNED serviceList MESSAGE DRILL-DOWN BUSINESS SERVICE DATA
"_MENU_"

Step 282: SEND "_get_serviceDetail_" XML INQUIRY WITH SOAP PROTOCOL TO UDDI REGISTRY Step 284: SELECT ITEM OF RETURNED serviceDetail MESSAGE
DISPLAY accessPoint URLs
FROM bindingTemplate DATA "DINNER"
IN RETURNED serviceDetail MESSAGE
URL="_www.kebabemporium\rsvp\dinner_"
URL="_www.kebabemporium\specials\dinner_"
URL="_www.kebabemporium\menu\dinner_"

FIG. 3A discloses a network process flow diagram showing the interaction of the wireless device and the UDDI registry when carrying out the UDDI registry browsing program of FIG. 2A. The network process flow diagram in FIG. 3A consists of three columns labeled respectively, wireless device 100, server 140 and UDDI registry 170. The process flow diagram FIG. 3A illustrates the interaction between steps carried in the wireless device 100 and steps carried out in the UDDI registry 170. The diagram of FIG. 3A begins with the wireless device 100 step 300, where the user location is obtained. Next, in step 301 a search handle is entered. and query terms are entered. At step 302, the find_business_query is sent with an appended locator to the UDDI registry 170. In the UDDI registry column 170 in FIG. 3A, the UDDI registry conducts searches based on the find_business_query and returns the businessList in step 320. The flow then returns to the wireless device 100 and passes to step 303 wherein an item of the businessList is selected which typically is a businessEntity. The businessEntity is then drilled down. The flow then passes to step 304 in which the find_service_query is sent with an appended locator to the UDDI registry. The flow then passes to the UDDI registry 170 where the find_service_query is searched and the service list is returned in step 321. Then the flow passes to the wireless device 100 where an item of the serviceList is selected which is a businessService. The businessService is subsequently drilled down in step 305. The flow proceeds to step 306 in which the _get_serviceDetail_query is sent to the UDDI registry. Then the flow passes to the UDDI registry 170 where the _get_serviceDetail_query is responded to and the binding template is returned in step 263. Then the flow passes back to the wireless device 100 wherein the serviceDetail is selected from the bindingTemplate and the accessPoint URL is stored.

FIG. 3B illustrates a network process flow diagram of the interaction of the wireless device and the UDDI registry when carrying out a program to replay the UDDI registry search strategy. FIG. 3B is divided into three columns, the wireless device column 100, the server 140 column, and the UDDI registry 170 column. FIG. 3B starts with the wireless device entering the replay UDDI registry search strategy wherein the search/locator handles are entered in step 310. Then the process flows to step 311 where the search strategy and/or location is accessed in the user profile which corresponds to the search/location handle which was inputted in step 310. FIG. 3B then proceeds through the remainder of the processes in a similar manner as that disclosed in FIG. 3A.

FIG. 3B discloses how the user is enabled to replay a prior UDDI registry search strategy using the same locator handle. The user merely enters a previously used search handle into the wireless device and selects the replay option. The wireless device then accesses the UDDI registry search strategy from the user's stored profile corresponding to that search handle. This may be performed either at the wireless device 100 or, in the alternate embodiment in the server 140. The search strategy includes information such as the businessEntity data and businessService data and bindingTemplate data that was found during the course of an earlier search of the UDDI registry 170. This data contained in the UDDI registry search strategy (accessed from the stored profile) is then loaded as the data for each respective operand that would have been otherwise entered by the user. In this way, the flow diagram of FIG. 3B enables the user to automatically invoke a search strategy of the UDDI registry 170, that was used in the past. A discussed above, the replay of a search strategy under a different locator handle embodies the process of FIGS. 3A and 3B, wherein the "regional search strategy" invokes query terms with a newly appended location. The query terms are sent according to FIG. 3A to return the new location search information.

Figure 4:
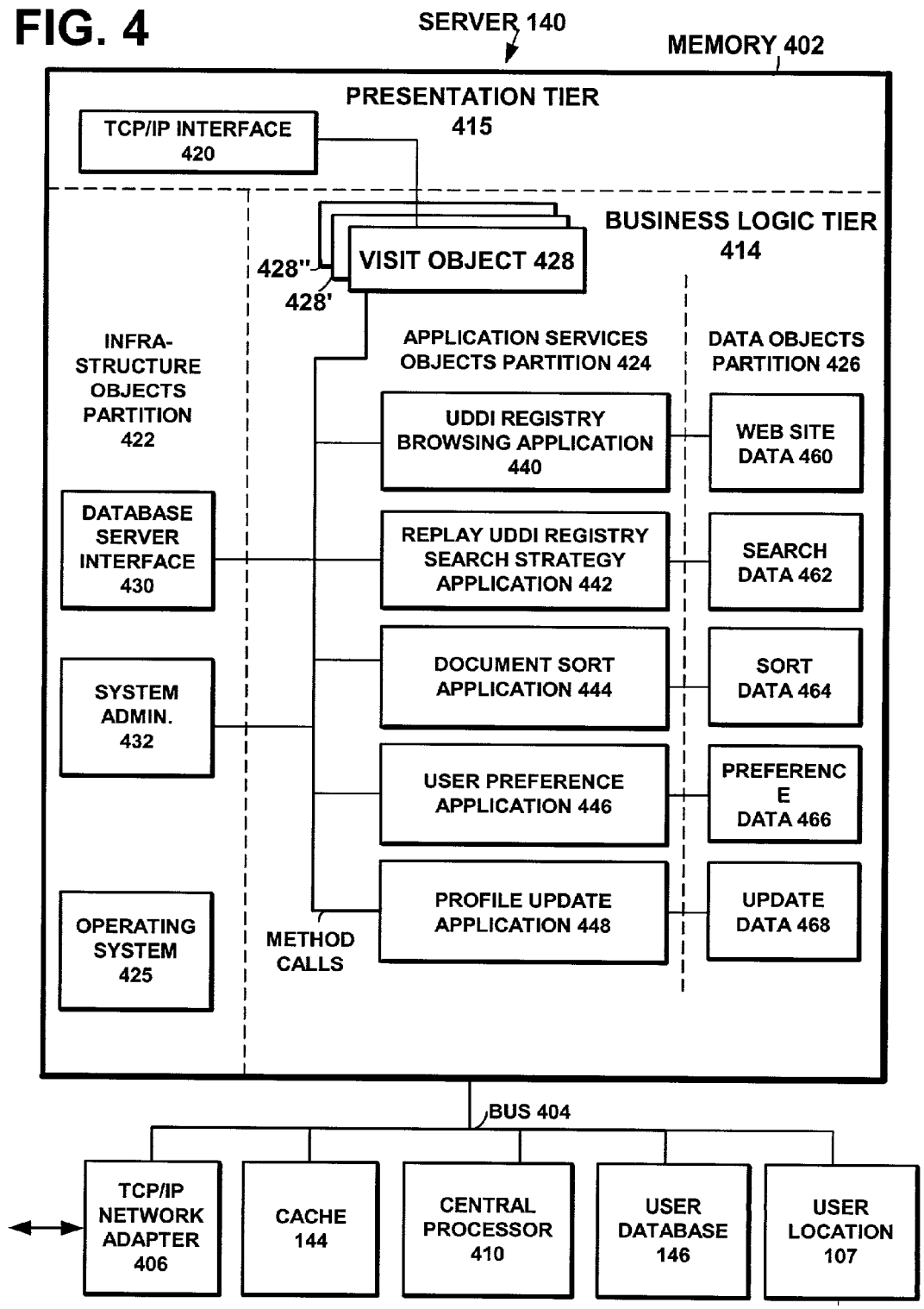
FIG. 4 is a functional block diagram of the knowledge engine server, showing the memory storing the application services software programs needed to perform the operations of the invention.

FIG. 4 is a functional block diagram of the knowledge engine server, showing the memory storing the application services software programs needed to perform the operations of an embodiment of the invention. FIG. 4 discloses the functional components of an exemplary knowledge engine server 140 arranged as an object model. The object model groups the object oriented software programs into components that perform the major functions and applications in knowledge engine server 140. The object model for memory 402 of knowledge engine server 140 employs a three-tier architecture that includes presentation tier 415, infrastructure objects partition 422, and business logic tier 414. The object model further divides business logic tier 414 into two partitions, application objects partition 422 and data objects partition 426.

Presentation tier 415 retains the programs that manage the device interfaces to knowledge engine server 140. In FIG. 4, presentation tier 415 includes network interface 420. A suitable implementation of presentation tier 415 may use Java servlets to interact with WAP protocol gateway 120 via the hypertext transfer protocol ("HTTP"). The Java servlets run within a request/response server that manages the exchange of messages between WAP protocol gateway 120 and knowledge engine server 140. A Java servlet is a Java program that runs within a Web server environment. A Java servlet takes a request as input, parses the data, performs logic operations, and issues a response back to WAP protocol gateway 120. The Java runtime platform pools the Java servlets to simultaneously service many requests. Network interface 420 accepts request messages from WAP protocol gateway 120 and passes the information in the request to visit object 428 for further processing. Visit object 428 passes the result of that processing to network interface 420 for transmission back to the WAP protocol gateway 120. Network interface 420 may also use network adapter 406 to exchange data with another user device.

Infrastructure objects partition 422 retains the programs that perform administrative and system functions on behalf of business logic tier 414. Infrastructure objects partition 422 includes operating system 425, and an object oriented software program component for database server interface 430, and system administrator interface 432.

Business logic tier 414 in FIG. 4 includes multiple instances of visit object 428, 428', 428". A separate instance of visit object 428 exists for each network interface 420 session. Each visit object 428 is a stateful session bean that includes a persistent storage area from initiation through termination of the session, and not just during a single interaction or method call. The persistent storage area retains information associated with the session.

When WAP protocol gateway 120 sends a query message to knowledge engine server 140, the message is sent to network interface 420 to invoke a method that creates visit object 428 and stores connection information as a state in visit object 428. Visit object 428 may, in turn, invoke a method in UDDI registry browsing application 440 to browse the UDDI registry 170. Application 440 sends queries to the UDDI registry, as discussed above.

When WAP protocol gateway 120 sends a search and/or location handle message to knowledge engine server 140, a message is sent to network interface 420 to invoke a method that creates visit object 428 and stores connection information as a state in visit object 428. Visit object 428 may, in turn, invoke a method in replay UDDI registry search strategy or location application 442 to replay a prior search strategy. The application 442 performs the replay method discussed above. Similar operations occur for applications 444, 446 and 448 in FIG. 4.

Figure 4A:
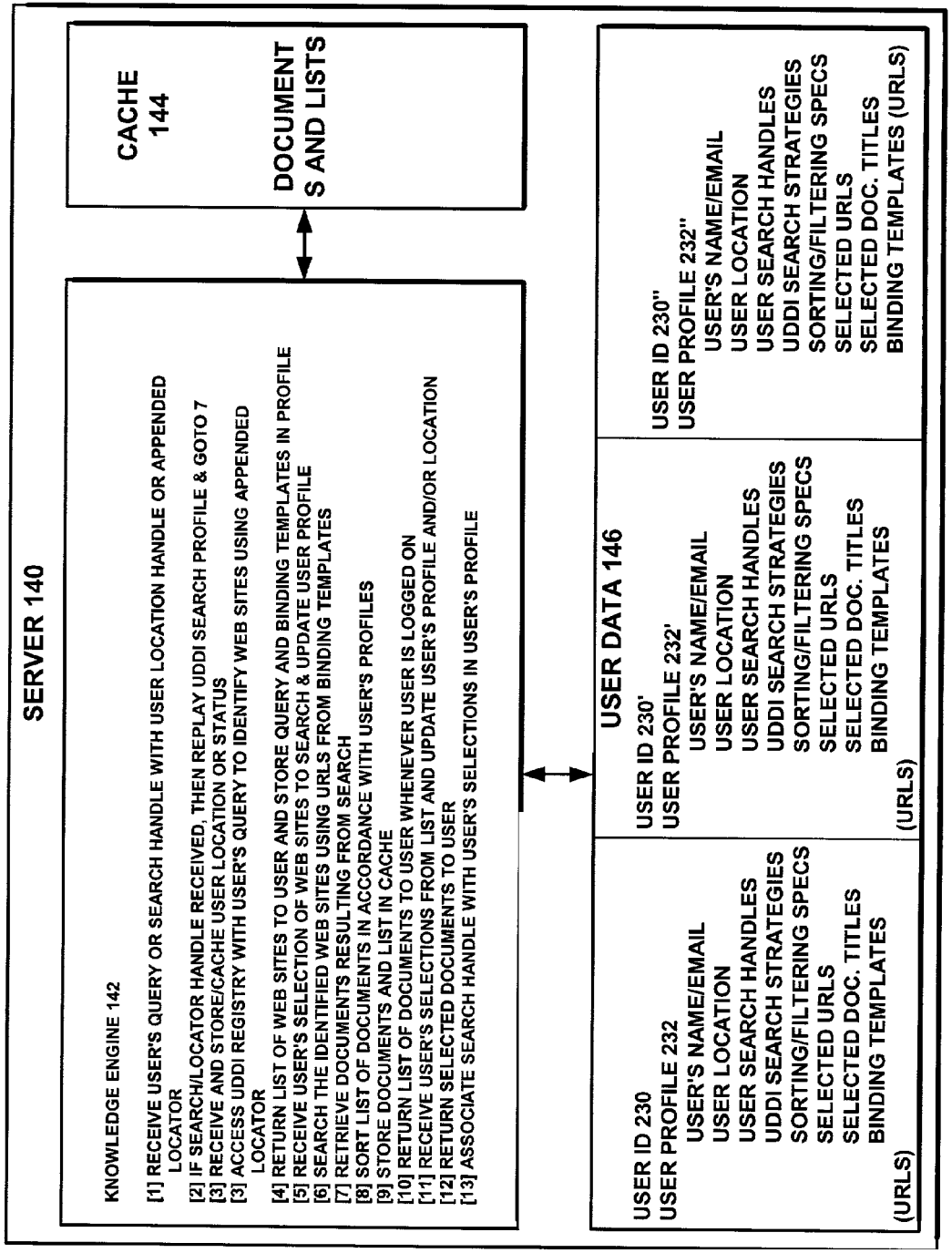
FIG. 4A is a more detailed functional block diagram of the server, showing the knowledge engine.

FIG. 4A is a more detailed functional block diagram of the server, showing the knowledge engine 142. The knowledge engine 142 includes a program which is shown in FIG. 4A as a sequence of steps 1 through 13.

KNOWLEDGE ENGINE 142
[1] RECEIVE USER'S QUERY OR SEARCH HANDLE WITH USER LOCATION HANDLE OR APPENDED LOCATOR
[2] IF SEARCH/LOCATOR HANDLE RECEIVED, THEN REPLAY UDDI SEARCH PROFILE & GOTO 7
[3] RECEIVE AND STORE/CACHE USER LOCATION OR STATUS
[3] ACCESS UDDI REGISTRY WITH USER'S QUERY TO IDENTIFY WEB SITES USING APPENDED LOCATOR
[4] RETURN LIST OF WEB SITES TO USER AND STORE QUERY AND BINDING TEMPLATES IN PROFILE
[5] RECEIVE USER'S SELECTION OF WEB SITES TO SEARCH & UPDATE USER PROFILE
[6] SEARCH THE IDENTIFIED WEB SITES USING URLS FROM BINDING TEMPLATES
[7] RETRIEVE DOCUMENTS RESULTING FROM SEARCH
[8] SORT LIST OF DOCUMENTS IN ACCORDANCE WITH USER'S PROFILES
[9] STORE DOCUMENTS AND LIST IN CACHE
[10] RETURN LIST OF DOCUMENTS TO USER WHENEVER USER IS LOGGED ON
[11] RECEIVE USER'S SELECTIONS FROM LIST AND UPDATE USER'S PROFILE AND/OR LOCATION
[12] RETURN SELECTED DOCUMENTS TO USER
[13] ASSOCIATE SEARCH HANDLE WITH USER'S SELECTIONS IN USER'S PROFILE

Also provided in server 140 is the user data 146 which includes the user ID profile 230 which is discussed above. Since a plurality of users may make use of the server 140, there are a plurality of user profiles shown in FIG. 4A, one for the user ID 230' having user profile 232' and another for the user ID 230" having user profile 232". The server 140 of FIG. 4A also has a cache 144 which stores documents and lists which are obtained from the various websites 160 that have been interrogated by the user with the aid of the server 140.

Figure 4B:
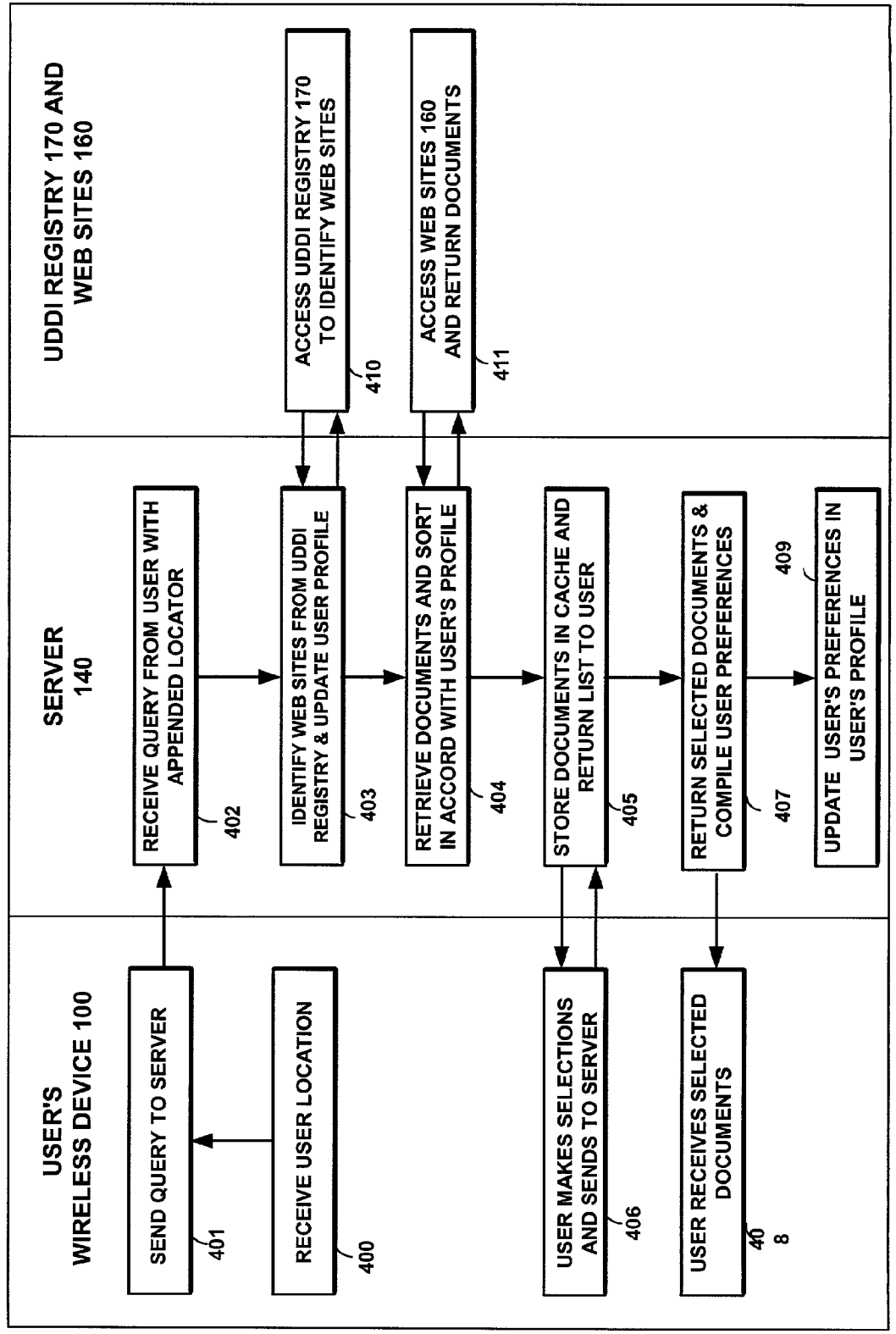
FIG. 4B is a network process flow diagram of the interaction of the wireless device, the knowledge engine server, and the UDDI registry when carrying out the UDDI registry browsing program in the server.

FIG. 4B is a flow diagram of the sequence of operational steps for the server 140 UDDI registry browsing program 170. FIG. 4B has three columns, the first column labeled user's wireless device 100, the second column labeled server 140, and a third column labeled UDDI registry 170 and web sites 160. FIG. 4B illustrates the interaction of the wireless device 100, the server 140, the UDDI registry 170 and the web sites 160, in accordance with an embodiment of the invention. Starting with the user's wireless device 100, FIG. 4B receiving a user location 400, and subsequently sending a query to the server, in step 401. At the server 140, the location-specific query is received from the user in step 402, and the process flows to step 403 where web sites are identified from the UDDI registry and the user's profile is updated. The process in step 403 for identification of the web sites from the UDDI registry is the process which has been discussed above in connection with FIGS. 2A and 3A. The process then flows to step 410 in the UDDI registry 170, wherein the UDDI registry accesses the requested information in response to the queries sent from the server 140 to identify web sites. Step 410 then transfers the results of that search from the UDDI registry 170 back to the server 140. At the server 140, the process flows to step 404 wherein the server has taken the information identifying the web sites received from the UDDI registry 170, and formulates a request to retrieve documents which is sent to the web sites 160. The process then flows to step 411 where the web sites 160 receiving the request from the server 140, access their respective severs for the requested documents and then return the documents to the server 140. The server 140 then sorts the documents into a list in accord with the user's profile/preferences, sorting the list into the order requested by the user (e.g. closest proximity to location), and filtering out any documents which the user is not interested, in accordance with the user's profile. The process then flows to step 405 in which the documents are stored in the cache at the server, cache 144, and the list which has been sorted by the server 140, is returned to the user. The process then flows to step 406 at the user's wireless device 100 where the sorted list received from the server 140 is presented to the user and the user can select from that list those documents desired to be reviewed. In step 406, the user's request for documents is then sent back to the server 140. The process then flows to step 407 where the server 140 accesses its cache 144 to retrieve those documents selected by the user in step 406, and then the server 140 returns the selected documents to the user's wireless device 100. Step 407 then compiles the user's preferences in the user profile. The server 140 can also update the user's preferences in the user's profile in step 409. The process flows from step 407 to step 408 at the user's wireless device 100, where the user receives the selected documents.

Figure 5:
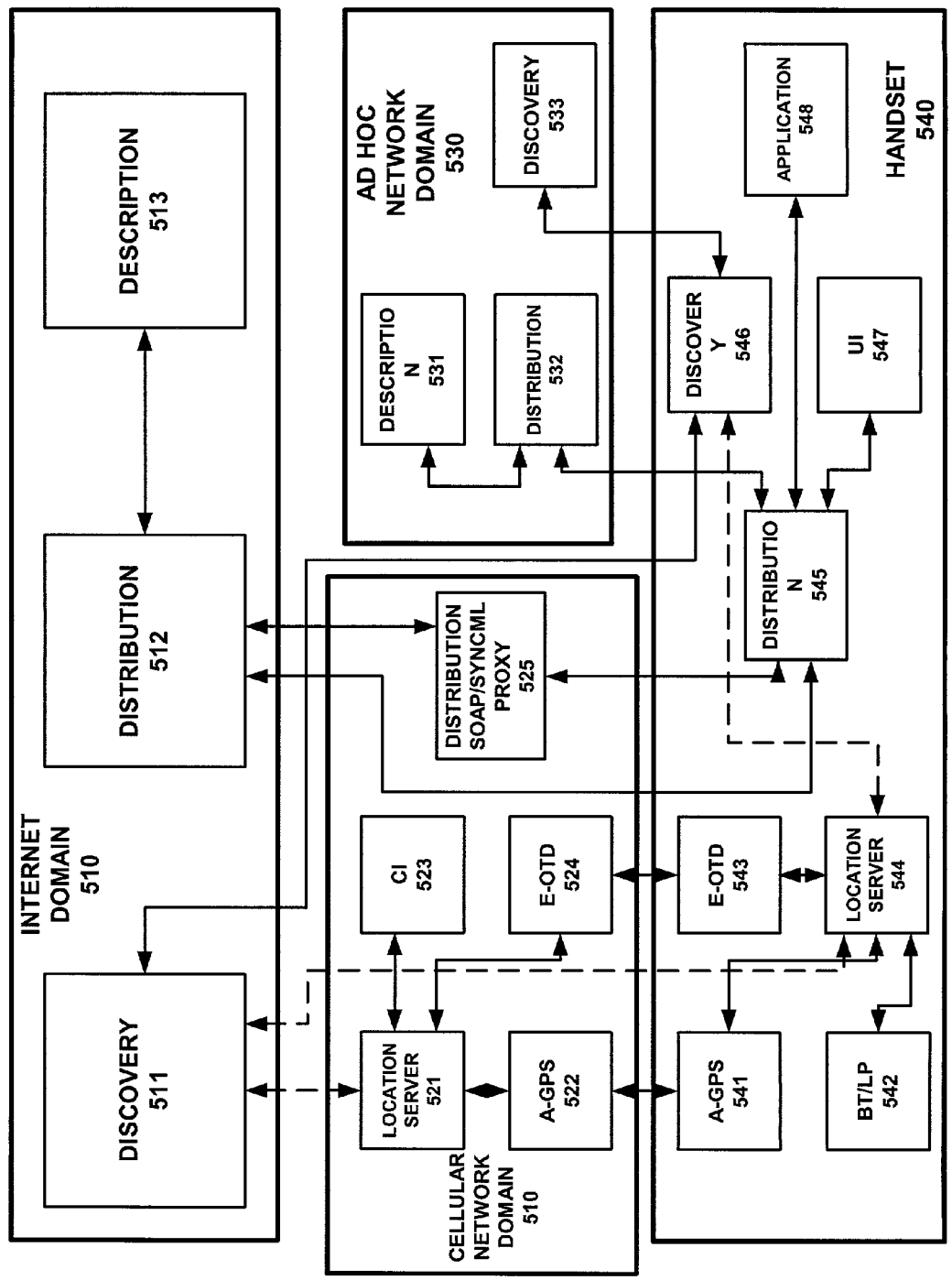
FIG. 5 illustrates the location-based service discovery of web services and ad-hoc networking environments with additional Bluetooth™ capabilities.

In an alternate embodiment, FIG. 5 globally illustrates location based service discovery in Web services and ad-hoc networking environments (UBICOMM, intranet home/ofice networks, etc.). FIG. 5 discloses the communication between the Internet Domain 510, Cellular Network Domain (2G/3G access/core networks), 510, the Ad-Hoc Network Domain 530, and the user handset 540. The Internet Domain 510 consists of discovery services 511, distribution services 512 and description services 513, in which the Internet Domain 510 communicates to the Cellular Network 510 and user handset 540. Similarly, the disclosed Ad Hoc Domain 530 also consists of Description 531, Distribution 532, and Discovery 533 services that are communicatively coupled to the handset 540.

The discovery (511, 546, 533) and distribution (512, 545, 532) services in the system are communicatively linked, wherein an optional distribution SOAP/SYNCML proxy 525 may be implemented in the Cellular Network 510. The Cellular Network 510 further comprises of a location server 521, a Cell Identification 523, an Assisting Global Positioning System (A-GPS) 522, and a Mobile-Based Enhanced Observed Time Difference (E-OTD) 524. These elements serve to help identify locations and/or positions of the handset 540 during operation under the present invention.

The handset 540 is also enabled with A-GPS 541 and E-OTD 543, both of which communicate to the Cellular Network 510 and to the handset location server 544. Additionally, the handset 540 can be equipped with Bluetooth™/Local Positioning (BT/LP) capabilities 542. The BT/LP capabilities further allow the wireless handset to establish a user location that may be utilized for queries, discussed above. The User Interface (UI) 547 and Application Programs 548 are also communicatively coupled to the handset distribution services 545. The service discovery agent typically communicates through the location server 521, Internet Domain Discovery 511, handset Location Server 544 and Discovery 546 (indicated in dashed lines). The remainder of the communicative links are enabled to transfer location between service discovery agents.

Figure 6:
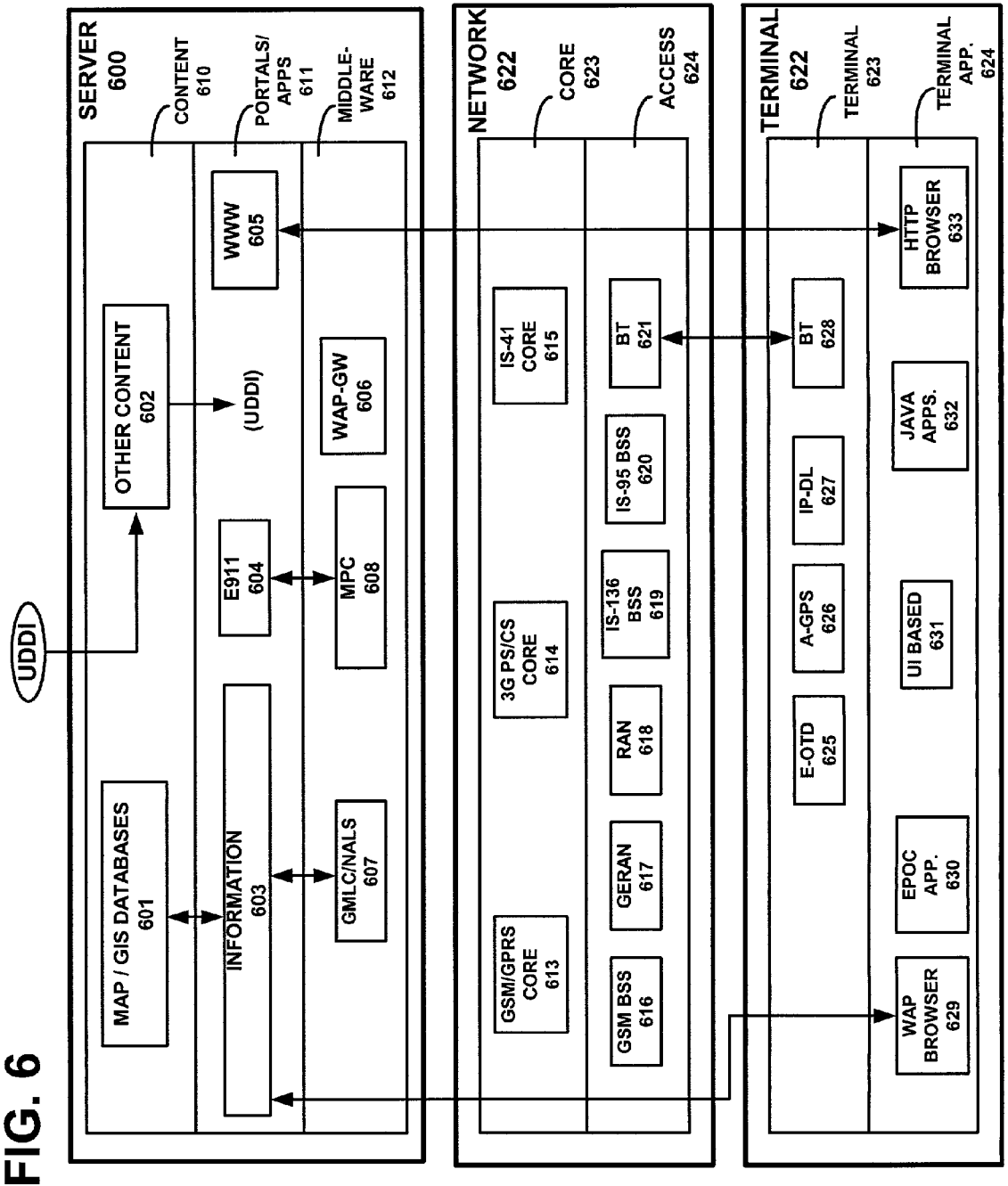
FIG. 6 discloses location standardization in a network framework

FIG. 6 discloses an alternate embodiment and illustrates location standardization in a network framework. In FIG. 6, a server 600, a network 622, and a terminal 622 are disclosed. The server 600 comprises three levels of software and locator services: content 610, portals/applications 611 and middleware 612. The content 610 will typically consist of map location and map information service and/or databases (MAP/GIS) 601. The map information 601 communicates to the portals/applications 611 under an open GIS consortium (e.g. Mapquest™). Additionally, other content 602 may be included or added (e.g., white pages, yellow pages, etc.). The content may be accessed through UDDI, where the queries may be further accessed to the portals/applications 611. In the portals/applications 611, information 603 such as fleet management, presence or enhanced alarm calls with locator information (E112=Europe; E911=U.S.) may be located. The information 603 if communicatively coupled to a gateway mobile location center (GMLC) or Nokia Artus™ location server 607. The enhanced alarm calls with locator information (604) are typically in communication with a mobile positioning center (MPC) 608, located in the middleware 612. A WAP-GW 606 application is further locate in the server middleware 612.

The network 622 is shown as having two layers, namely the core 623 and access 624 layers. The core 623 typically consists of a Global System for Mobile Communications (GSM)/General Packet Radio Service core 613, a $3^{rd}$ Generation Packet Switched (PS)/Circuit Switched (CS) core 614 and an Interim Standard 41 (IS-41) signaling protocol core 615. The access layer 624 consists of a GSM Base Station System (BSS) 616, GSM/EDGE Radio Access Network GERAN 617, Radio Access Network (RAN) 618, IS-136 BSS 619, IS-95BSS 620 and a Bluetooth™ connection 621.

The terminal partition 622 is disclosed as having layers for the terminal 623, and terminal applications 624. The terminal 623 layer consists of E-OTD 625, A-GPS 626, a $3^{rd}$ generation location method (IP-DL) 627, as well as a Bluetooth™ protocol 628, which is communication with the access layer's 624 Bluetooth™ connection 621 of network 622. The terminal applications include a WAP browser 629, which communicates to the information 603 contained in the portals/applications layer 611 of server 600. The terminal application further include EPOC Applications 630 (Symbian™ operating system), User Interface-Based Applications 631, JAVA applets 632, and an HTTP browser 633, which is communicatively coupled to the WWW 605 in Server 600.

Through the system disclosed above, the user may select location information that is pasted/appended to the service discovery message. As already discussed the user's location may be determined through A-GPS, GPS, E-OTD, or other methods. The wireless device will be enabled with software that will include the user location/coordinates. If the location is executed through the network, the user may use the "Loc" button (and associated function) to include location information in the service discovery message. The subsequently received information would then be filtered accordingly. The location information can also be received from a Bluetooth™ device in which specific locations may be predefined. Thus, information from the Bluetooth™ device will be beamed to the mobile device in a Bluetooth™ message into the service discovery message. The location information may be in the form of CI, GPS info, E-OTD, etc., or may even have the name of a unique place (e.g. Statue of Liberty).

It is understood that under the aforementioned embodiments, the term "document" may accompany elements and information other than web page text. While one type of usage under the present invention encompasses text searching, the service searched with UDDI may include other services, such as streaming audio, video, or other application-specific communication. Furthermore, alternate embodiments of the present invention may include location "nests", where location searches can start in a broad geographical region, and may be subsequently narrowed by the user.

Although illustrative embodiments have been described herein in detail, it should be noted and understood that the descriptions and drawings have been provided for purposes of illustration only and that other variations both in form and detail can be made thereupon without departing from the spirit and scope of the invention. The terms and expressions have been used as terms of description and not terms of limitation. There is no limitation to use the terms or expressions to exclude any equivalents of features shown and described or portions thereof.

What is claimed is:

1. A method to enable a wireless user device to discover Internet businesses or services by accessing the Universal Description, Discovery and Integration (UDDI) registry, comprising:
   (a) receiving a query for discovering Internet businesses or services from the wireless user device at a network server location capable of contacting the UDDI registry;
   (b) establishing a geographical location for the wireless user device;
   (c) appending, at the network server location, the geographical location to an Internet business or a service discovery request;
   (d) performing the Internet business or service discovery request by way of contacting the UDDI registry for identifying web sites dependent on the established geographical location;
   (e) formulating, at the network server location, requests to access and retrieve files from the identified web sites; and
   (e) caching files accessed from the identified web sites, at the network service location, for selective forwarding to the user's wireless device;
   wherein the selective forwarding comprises sorting and filtering the cached files in accordance with preferences of a user of the wireless user device maintained at the network server location.

2. The method of claim 1, wherein the method is embodied as programmed instructions executed within a separate knowledge engine server to query the UDDI registry in response to commands from the user's wireless device.

3. The method of claim 1, wherein establishing the geographical location of a wireless device includes a Global Positioning System (GPS) coordinate.

4. The method of claim 1, wherein establishing the geographical location of a wireless device utilizes Mobile-Based Enhanced Observed Time Difference.

5. The method of claim 1, wherein establishing the geographical location of a wireless device includes map information services/databases.

6. The method of claim 1, wherein establishing the geographical location of a wireless device utilizes a gateway mobile location center.

7. The method of claim 1, wherein establishing the geographical location of a wireless device includes receiving a cell ID associated with the wireless device, the cell ID indicating the geographical location of the wireless device.

8. A method to enable a wireless device to discover Internet businesses or services by accessing the Universal Description, Discovery and Integration (UDDI) registry, comprising:
   (a) entering a location handle that will be associated with a geographic location of the wireless device;
   (b) receiving location data and linking the location data to the location handle;
   (c) entering at least one query term;
   (d) sending a find_business XML inquiry to the UDDI registry in response to the entered query terms with appended location data;
   (e) receiving back from the UDDI registry, a businessList message that contains a list of business names satisfying the find_business query and location data;
   (f) storing the at least one query term and identifying the stored term with a search handle;
   (g) replaying the search handle by the user using abbreviated means, wherein said replaying comprises appending the search handle with updated geographical location data; and
   (h) receiving files sorted and filtered in accordance with preferences of the user of the wireless user device in response to replaying said updated search handle.

9. The method of claim 8, which further comprises:
   (a) selecting an item from the returned businessList message;
   (b) drilling down in the selected business' entity data;
   (c) sending a find_service XML inquiry to the UDDI registry;
   (d) receiving back from the UDDI registry, a serviceList message that contains a list of names of services offered by the selected business in the geographical location.

10. The method of claim 9, which further comprises:
   (a) selecting an item from the returned serviceList message;
   (b) drilling down in the selected service data;
   (c) sending a get_serviceDetail_XML_inquiry to the UDDI registry;

(d) receiving back from the UDDI registry, a serviceDetail message that includes bindingTemplate data that contains the details of the selected service.

11. The method of claim 10, which further comprises: including in the bindingTemplate data an accessPoint URL, which is the URL of the selected service on the web site of the selected business.

12. The method of claim 11, which further comprises displaying the accessPoint URL to the user.

13. The method of claim 8, wherein the location data includes a Global Positioning System (GPS) coordinate.

14. The method of claim 8, wherein the location data utilizes Mobile-Based Enhanced Observed Time Difference.

15. The method of claim 8, wherein the location data includes map information services/databases.

16. The method of claim 8, wherein the location data utilizes data from a gateway mobile location center.

17. The method of claim 8, wherein receiving location data includes receiving a cell ID associated with the wireless device, the cell ID indicating the geographical location of the wireless device.

18. The method of claim 11, which further comprises:
    (a) storing the location handle in a user profile with the location data;
    (b) providing the user with a shortcut for appending location data, in response to the user's entry of abbreviated location handle to the wireless device.

19. The method of claim 8, which further comprises pasting a user location into the at least one query term search by pressing a hotkey button connected to the wireless device.

20. The method of claim 8, wherein the location data is updated in accordance with the geographic location of the wireless device.

21. A method to enable a wireless device to discover Internet businesses or services by accessing the Universal Description, Discovery and Integration (UDDI) registry, comprising:
    (a) entering a search handle in a user's wireless device that will be associated with the user's search strategy;
    (b) entering a location handle that will be associated with the user's location;
    (c) entering query terms in the wireless device as at least part of a business name;
    (d) transmitting the search handle, location handle and query terms to a knowledge engine server;
    (e) searching web sites using URLs contained in stored binding templates;
    (f) retrieving documents resulting from the search of the web sites;
    (g) applying a location filter prescribed by the user and stored in the user's profile, to limit the returned documents to only those of particular interest or location to the user;
    (h) sorting the documents in a list having an order established in accordance with user's profile or location; and
    (i) storing the filtered documents and the sorted list in a cache for later, selective forwarding to the user's wireless device.

22. The method of claim 21, which further comprises receiving the user's selections from the list and updating the user's profile with the user's preferences or location.

23. The method of claim 22, which further comprises associating the search handle with the user's selections and with the user's search strategy; storing that association in user's profile.

24. The method of claim 23, which further comprises providing the user with a shortcut for accessing pages from web sites, in response to the user's entry of an abbreviated search handle to the wireless device.

25. A system to enable a wireless device to discover Internet businesses or services by accessing the Universal Description, Discovery and Integration (UDDI) registry, comprising:
    a processor;
    a memory coupled to the processor, programmed to perform the steps of:
    forming a query to the UDDI registry on the wireless device;
    establishing a geographical location for the wireless device;
    appending the geographical location to a service discovery request so that responses to the query are dependent on the established geographical location; and
    caching files accessed from web sites, for selective forwarding to the user's wireless device, wherein said selective forwarding comprises sorting and filtering the cached files in accordance with preferences of a user of the wireless user device maintained at the network server location.

26. A system to enable a wireless device to discover Internet businesses or services by accessing the Universal Description, Discovery and Integration (UDDI) registry, comprising:
    a processor;
    a memory coupled to the processor, programmed to perform the steps of:
    entering a location handle that will be associated with a geographic location of the wireless device;
    receiving location data and linking the location data to the location handle;
    entering at least one query term;
    sending a find_business XML inquiry to the UDDI registry in response to the entered query terms with appended location data;
    receiving back from the UDDI registry a businessList message that contains a list of business names satisfying the find_business query and location data;
    storing the at least one query term and identifying the stored term with a search handle;
    replaying the search handle by the user using abbreviated means, wherein said replaying comprises appending the search handle with updated geographical location data; and
    receiving files sorted and filtered in accordance with preferences of the user of the wireless user device in response to replaying said updated search handle.

27. A system to enable a wireless device to discover Internet businesses or services by accessing the Universal Description, Discovery and Integration (UDDI) registry, comprising:
    a processor;
    a memory coupled to the processor, programmed to perform the steps of:
    entering a search handle in a wireless device that will be associated with the user's search strategy;
    entering a location handle that will be associated with the user's location;
    entering query terms in the wireless device as at least part of a business name;
    transmitting the search handle, location handle and query terms to a knowledge engine server;

searching web sites using URLs contained in stored binding templates; retrieving documents resulting from the search of the web sites;

applying a location filter prescribed by the user and stored in the user's profile, to limit the returned documents to only those of particular interest or location to the user;

sorting the documents in a list having an order established in accordance with user's profile or location; and storing the filtered documents and the sorted list in a cache for later, selective forwarding to the user's wireless device.

28. A system to enable a wireless device to discover Internet businesses or services by accessing the Universal Description, Discovery and Integration (UDDI) registry, comprising:

a processor;

a hotkey switch;

a memory coupled to the processor, programmed to perform the steps of:

entering a location handle that will be associated with a geographic location of the wireless device, wherein the geographical location is further associated with the hotkey switch;

receiving location data and linking the location data to the location handle and hotkey switch;

entering at least one query term;

appending geographical location to the query through the activation of the hotkey switch;

sending a find_business XML inquiry to the UDDI registry in response to the entered query terms with appended location data;

receiving back from the UDDI registry, a businessList message that contains a list of business names satisfying the find_business query and location data;

storing the at least one query term and identifying the stored term with a search handle;

replaying the search handle by the user using abbreviated means, wherein said replaying comprises appending the search handle with updated geographical location data; and receiving files sorted and filtered in accordance with preferences of the user of the wireless user device in response to replaying said updated search handle.

* * * * *